(12) United States Patent
Tanaka et al.

(10) Patent No.: US 9,141,334 B2
(45) Date of Patent: Sep. 22, 2015

(54) INFORMATION PROCESSING FOR OUTPUTTING VOICE

(71) Applicant: CANON KABUSHIKI KAISHA, Tokyo (JP)

(72) Inventors: Tomonori Tanaka, Ageo (JP); Yasuo Okutani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 281 days.

(21) Appl. No.: 13/648,857

(22) Filed: Oct. 10, 2012

(65) Prior Publication Data

US 2013/0110514 A1    May 2, 2013

(30) Foreign Application Priority Data

Nov. 1, 2011    (JP) ................................. 2011-240661

(51) Int. Cl.
 *G10L 13/08* (2013.01)
 *G10L 21/00* (2013.01)
 *G06F 3/16* (2006.01)

(52) U.S. Cl.
 CPC ....................................... *G06F 3/165* (2013.01)

(58) Field of Classification Search
 CPC ....................................................... G06F 3/165
 See application file for complete search history.

(56) References Cited

U.S. PATENT DOCUMENTS

| | | | | |
|---|---|---|---|---|
| 5,631,883 | A * | 5/1997 | Li ................................. | 434/311 |
| 5,822,284 | A * | 10/1998 | Nishizawa ................. | 369/30.04 |
| 6,441,811 | B1 * | 8/2002 | Sawada et al. ................ | 345/204 |
| 7,020,663 | B2 * | 3/2006 | Hay et al. ...................... | 434/317 |
| 7,107,533 | B2 * | 9/2006 | Duncan et al. ................ | 715/727 |
| 7,158,936 | B2 * | 1/2007 | Denenberg et al. ........ | 704/270.1 |
| 7,516,073 | B2 * | 4/2009 | Kodama ........................ | 704/270 |
| 7,861,186 | B2 * | 12/2010 | Stefik et al. .................. | 715/850 |
| 2003/0033147 | A1 * | 2/2003 | McCartney et al. .......... | 704/260 |
| 2007/0134638 | A1 * | 6/2007 | Mullen .......................... | 434/317 |
| 2007/0280438 | A1 * | 12/2007 | Pritchett et al. ............. | 379/88.13 |
| 2010/0042702 | A1 * | 2/2010 | Hanses ......................... | 709/219 |
| 2010/0225809 | A1 * | 9/2010 | Connors et al. ............... | 348/500 |
| 2011/0059426 | A1 * | 3/2011 | Mamigonians ............... | 434/317 |
| 2012/0001923 | A1 * | 1/2012 | Weinzimmer et al. ........ | 345/473 |
| 2012/0084455 | A1 * | 4/2012 | McCue et al. ................ | 709/231 |
| 2012/0084704 | A1 * | 4/2012 | Lee et al. ...................... | 715/776 |
| 2012/0310649 | A1 * | 12/2012 | Cannistraro et al. .......... | 704/260 |
| 2013/0191131 | A1 * | 7/2013 | Hendricks et al. ............ | 704/273 |
| 2014/0052283 | A1 * | 2/2014 | Cameron et al. ............... | 700/94 |
| 2014/0085196 | A1 * | 3/2014 | Zucker et al. ................. | 345/156 |
| 2014/0160009 | A1 * | 6/2014 | Hendrickson et al. ........ | 345/156 |

FOREIGN PATENT DOCUMENTS

JP    5-313565 A    11/1993

* cited by examiner

*Primary Examiner* — Brian Albertalli
(74) *Attorney, Agent, or Firm* — Fitzpatrick, Cella, Harper & Scinto

(57) ABSTRACT

A page designated by a page designation instruction of those included in an electronic book is displayed. When a voice output instruction is input, a page displayed at that input timing is set as a voice output page, and voices corresponding to respective characters in the voice output page are sequentially output in accordance with an arrangement order of the characters. A start character from which a voice output operation is started is determined based on characters in the voice output page, and voices corresponding to characters, which include the start character and subsequent characters, are controlled to be sequentially output in accordance with the arrangement order.

18 Claims, 28 Drawing Sheets

FIG. 17A

| PAGE NUMBER | LINE COUNT | CHARACTER COUNT FROM START CHARACTER OF LINE |
|---:|---:|---:|
| 5 | 1 | 1 |

FIG. 17B

| PAGE NUMBER | LINE COUNT | CHARACTER COUNT FROM START CHARACTER OF LINE |
|---:|---:|---:|
| 5 | 4 | 4 |

FIG. 18

| PAGE | PAGE VISITING TIME Z (UNIT = msec) |
|---|---|
| 6 | 100 |
| 7 | 100 |
| 8 | 100 |
| 9 | 100 |
| 10 | 2000 |
| 9 | 100 |
| 8 | 100 |
| 7 | 100 |
| 6 | 100 |
| 5 | 3200 |

FIG. 19

| PAGE | PAGE VISITING TIME Z (UNIT = msec) |
|---|---|
| 4 | 100 |
| 3 | 100 |
| 2 | 100 |
| 1 | 2000 |
| 2 | 100 |
| 3 | 100 |
| 4 | 100 |
| 5 | 3200 |
|  |  |
|  |  |

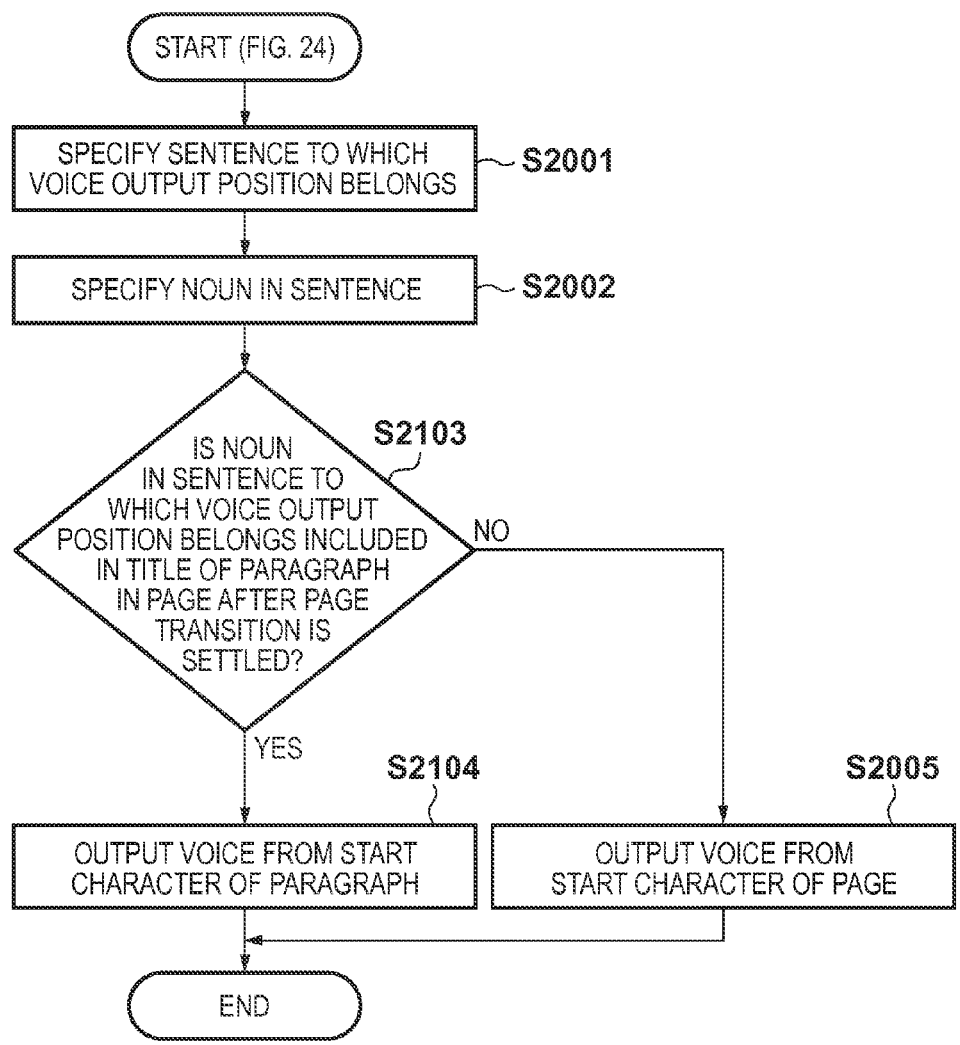

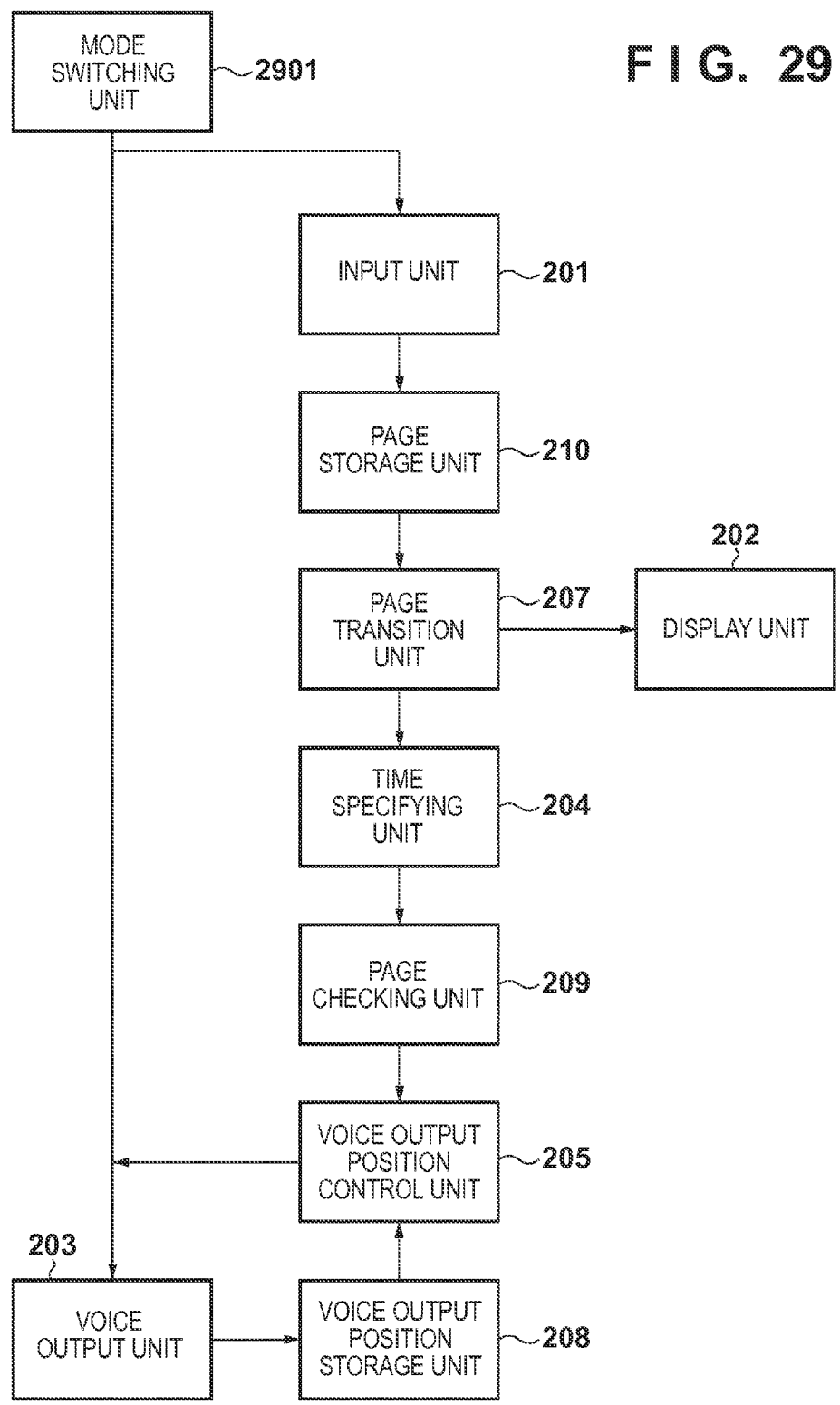

INFORMATION PROCESSING FOR OUTPUTTING VOICE

BACKGROUND OF THE INVENTION

1. Field of the Invention

The present invention relates to a technique required to attain display and voice output operations of an electronic book.

2. Description of the Related Art

Conventionally, a technique for controlling a voice output operation of an electronic book content having page information is known. Also, a technique for making a voice output operation from a predetermined position (from a start sentence of a page) when an electronic book content undergoes page transition is known (Japanese Patent Laid-Open No. 5-313565).

However, a voice output position desired by the user varies depending on a page after a page transition.

SUMMARY OF THE INVENTION

The present invention has been made in consideration of the aforementioned problems, and provides a technique for automatically specifying a voice output restart position after page transition in correspondence with the user's intentions.

According to one aspect of the present invention, there is provided an information processing apparatus comprising: a display unit configured to display a page designated by a page designation instruction of pages included in an electronic book; a voice output unit configured to set a page displayed by the display unit as a voice output page at an input timing of a voice output instruction, and to sequentially output voices corresponding to respective characters in the voice output page in accordance with an arrangement order of the characters; and a control unit configured to determine a start character from which the voice output unit starts a voice output operation based on characters in the voice output page, and to control the voice output unit to sequentially output voices corresponding to characters, which include the start character and subsequent characters in accordance with the arrangement order.

According to another aspect of the present invention, there is provided an information processing method executed by an information processing apparatus, comprising: a display step of displaying a page designated by a page designation instruction of pages included in an electronic book; a voice output step of setting a page displayed in the display step as a voice output page at an input timing of a voice output instruction, and sequentially outputting voices corresponding to respective characters in the voice output page in accordance with an arrangement order of the characters; and a control step of determining a start character from which a voice output operation is started in the voice output step based on characters in the voice output page, and controlling to sequentially output voices corresponding to characters, which include the start character and subsequent characters in accordance with the arrangement order in the voice output step.

Further features of the present invention will become apparent from the following description of exemplary embodiments with reference to the attached drawings.

BRIEF DESCRIPTION OF THE DRAWINGS

FIGS. 17A and 17B are tables showing configuration examples of a voice output position registered in a voice output position storage unit 208;

FIG. 18 is a table showing a configuration example of information managed by a time specifying unit 204;

FIG. 19 is a table showing a configuration example of information managed by the time specifying unit 204;

FIG. 21 is a flowchart of the processing in step S2401;

FIG. 29 is a block diagram showing an example of the functional arrangement of the information processing apparatus 2300.

DESCRIPTION OF THE EMBODIMENTS

Embodiments of the present invention will be described hereinafter with reference to the accompanying drawings. Note that embodiments to be described hereinafter are examples when the present invention is practiced, and are practical embodiments of the arrangements described in the scope of the claims.

[First Embodiment]

Figure 1:
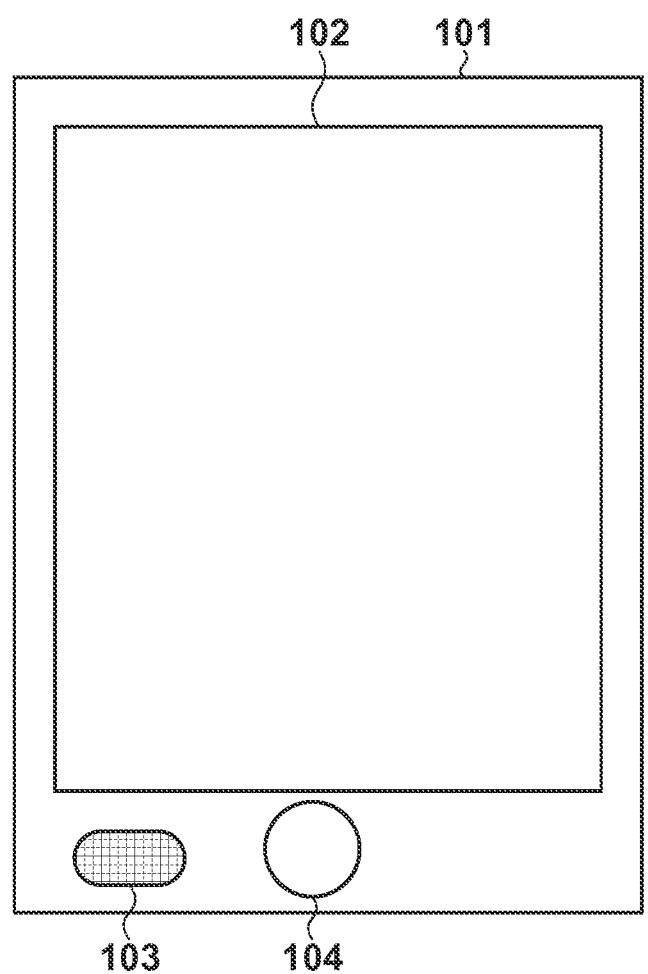
FIG. 1 is a view showing an example of the outer appearance of an information processing apparatus.

An example of the outer appearance of an information processing apparatus according to this embodiment will be described below with reference to FIG. 1. An information processing apparatus 101 shown in FIG. 1 includes a touch panel screen 102, loudspeaker 103, and voice output button 104. Note that the outer appearance of the information processing apparatus 101 is not limited to that shown in FIG. 1, and various outer appearances are applicable. For example, the layout positions of the touch panel screen 102, loudspeaker 103, and voice output button 104 are not limited to those shown in FIG. 1, and the numbers of buttons and loudspeakers may be increased/decreased as needed according to use applications.

The touch panel screen 102 functions as a display screen used to display images, characters, and the like, and also as a so-called touch panel which detects a touch operation by a designation tool such as the user's finger.

When the user presses the voice output button 104 by his or her finger, he or she can input a voice output instruction to the information processing apparatus 101. Upon detection of this voice output instruction, the information processing apparatus 101 outputs a voice (for example, that based on WAVE data of a PCM format sampled at 22.05 kHz) from the loudspeaker 103.

In this embodiment, assume that electronic book data (electronic book content or electronic text content) and data of a voice waveform obtained by reading aloud the electronic book (voice waveform data) are downloaded in advance in the information processing apparatus 101. However, the present invention is not limited to this. For example, these data may be stored in an external apparatus, and may be downloaded as needed.

Assume that an electronic book of this embodiment is described using SMIL (Synchronized Multimedia Integration Language) as a markup language compliant with XML of the W3C. Each character in each page in an electronic book and a voice waveform position (voice output position) where the character is uttered in voice waveform data are associated with each other (synchronized with each other). That is, in the voice waveform data, voice waveform data of an arbitrary character in an arbitrary page in an electronic book can be uniquely specified. Also, assume that for example, information such as a page number, line count, and character count from a start (end) character of a line from, for example, SMIL description information. Also, assume that the information such as a page number, line count, and character count from a start (end) position of a line is collated with the SMIL description information, thereby allowing to specify a voice output position on voice waveform data and a sentence to which the voice output position belongs. Since the SMIL technique is known, a description thereof will not be given.

Figure 2:
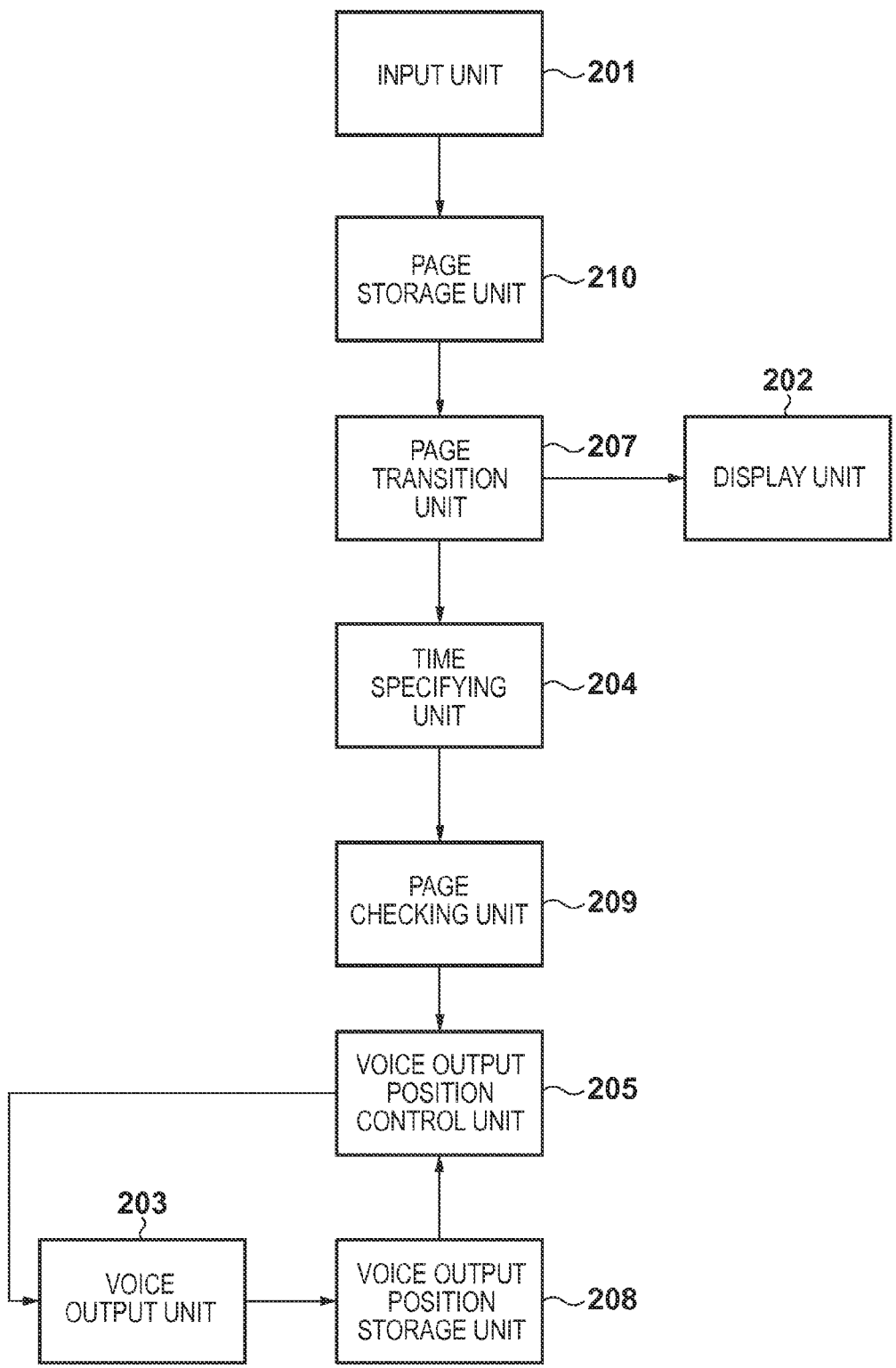
FIG. 2 is a block diagram showing an example of the functional arrangement of an information processing apparatus 101.

An example of the functional arrangement of the information processing apparatus 101 according to this embodiment will be described below with reference to the block diagram shown in FIG. 2. Note that the arrangement shown in FIG. 2 is an example. For example, some of the following units may be integrated, and any other arrangements may be adopted as long as they can implement respective processes to be described hereinafter.

An input unit 201 detects a touch operation on the touch panel screen 102 and pressing of the voice output button 104. For example, the input unit 201 specifies a user's flick operation in the right (left) direction on the touch panel screen 102. A page storage unit 210 stores numbers of pages for which voice output operations were made previously.

A page transition unit 207 specifies a page (that as a transition destination) to be displayed on the touch panel screen 102 based on a flick operation detected by the input unit 201. For example, when the input unit 201 detects a right flick operation (page designation instruction), the next page of a page currently displayed on the touch panel screen 102 (a page designated by the page designation instruction) is specified as a display target on the touch panel screen 102. For example, when the 5th page is currently displayed on the touch panel screen 102, and the input unit 201 detects a right flick operation, the page transition unit 207 specifies the 6th page as a display target on the touch panel screen 102. For example, when the input unit 201 detects a left flick operation, the page transition unit 207 specifies a page immediately before the page currently displayed on the touch panel screen 102 as a display target on the touch panel screen 102. For example, when the 5th page is currently displayed on the touch panel screen 102, and the input unit 201 detects a left flick operation, the page transition unit 207 specifies the 4th page as a display target on the touch panel screen 102. Then, the page transition unit 207 supplies a video signal of the specified page of respective pages of the electronic book content to a display unit 202.

The display unit 202 supplies a signal of a video (that is, a screen of a page) based on a video signal supplied from the page transition unit 207 to the touch panel screen 102. In this embodiment, the display unit 202 supplies a video signal of a page specified by the page transition unit 207 to the touch panel screen 102.

A time specifying unit (timer unit) 204 resets a timer to zero in response to the flick operation detected by the input unit 201, and starts time measurement. Then, the time specifying unit 204 specifies a page displayed on the touch panel screen 102 at a timing when the timer value reaches a predetermined value as a page after transition. A page checking unit 209 compares a number of a page for which a voice output operation was performed lastly with that of the page after transition.

A voice output position control unit 205 determines a character in a page from which a voice output operation is to be started (a voice output position from which a voice output operation is to be started) upon pressing of the voice output button 104 in accordance with the comparison result of the page checking unit 209 and the like.

A voice output position storage unit 208 collates with the SMIL description information, and stores information (information such as a page number, line count, and character count from a start character of a line) required to specify a last character as that for which a voice was output lastly as a voice output position. For example, as for a voice output position at the 2nd character in the 3rd line on the 5th page, a page number is 5, a line count is 3, and a character count from a start character of a line is 2.

A voice output unit 203 supplies voice signals based on voice waveform data from the voice output position determined by the voice output position control unit 205 to the loudspeaker 103.

Voice output processing to be executed by the information processing apparatus 101 according to this embodiment will be described below with reference to FIG. 4 which shows the flowchart of that processing. Assume that in the following description, an N-th (N≥1) page (to be referred to as page N hereinafter) in an electronic book content is displayed on the touch panel screen 102, and a voice output operation for this page N is not performed yet. In this state, when the user presses the voice output button 104, processes in step S401 and subsequent steps are started.

In step S401, if the input unit 201 detects pressing of the voice output button 104, the voice output position control unit 205 sets a position of a start character of the page N as a voice output start position. Then, the voice output unit 203 generates voice signals from voice waveform data of respective characters including the start character and subsequent characters of the page N, and supplies them to the loudspeaker 103. That is, in this step, when a voice output instruction is input upon pressing of the voice output button 104, the page N displayed on the touch panel screen 102 at the input timing is specified as a voice output page, and voices corresponding to respective characters in the voice output page are sequentially output according to an arrangement order of the characters. In step S402, the page storage unit 210 stores N as the number of the voice output page.

In step S403, the voice output position storage unit 208 stores information required to specify a last character as a character for which a voice was output lastly in the page N. That is, in this step, information required to specify a last character as a character for which a voice was output lastly by the voice output unit 203 in a voice output page is managed in a memory (voice output position storage unit 208).

Then, when the input unit 201 detects a left or right flick operation (an operation input for designating a page different from the page N as a display target on the touch panel screen 102), the process advances to step S405 via step S404. Note that in this embodiment, when it is detected that a voice output operation was made for the last character of the page N, since the page transition unit 207 specifies a page (N+1) as a display target on the touch panel screen 102, the process advances to step S405 via step S404 in this case.

Figure 4:
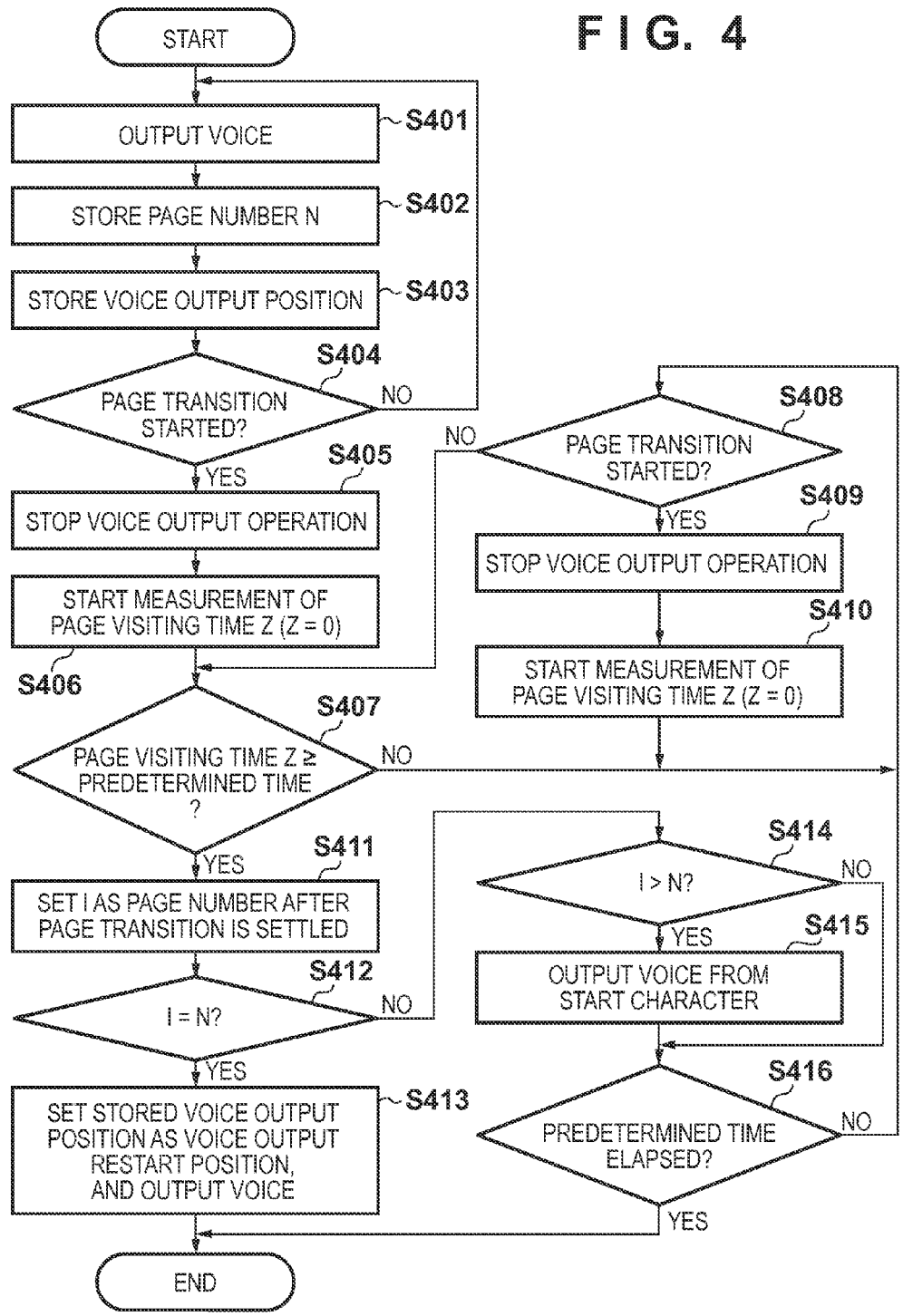
FIG. 4 is a flowchart of the processing to be executed by the information processing apparatus 101.

When the process advances to step S405, and when the input unit 201 detects a right flick operation, the page transition unit 207 specifies a page (N+1) as a display target (page transition destination) on the touch panel screen 102, although not shown in FIG. 4. On the other hand, when the input unit 201 detects a left flick operation, the page transition unit 207 specifies a page (N−1) as a display target (page transition destination) on the touch panel screen 102. Then, the page transition unit 207 supplies a video signal of the specified page of respective pages of the electronic book content to the display unit 202.

On the other hand, when the input unit 201 does not detect a left or right flick operation, the process returns to step S401 via step S404, and the subsequent processes are executed for the next character.

In this manner, voices of respective characters in the page N are sequentially output unless the input unit 201 detects a flick operation. Every time the voice output position at which a voice is to be output is advanced by one character in step S401, the last character is also advanced by one character accordingly.

FIG. 17A shows a configuration example of information registered in the voice output position storage unit 208 in first step S403 when N=5. As described above, since a voice output operation for a page 5 is not performed yet, a page number "5", and a position (a line count "1" and a character count "1" from a start character of a line) of the start character of the page 5 are registered as a voice output position in the voice output position storage unit 208. After that, when the voice output position is advanced, and a voice output operation is performed for the 4th character from the start character of the 4th line in the page 5, a position of the last character is "the page 5, 4th line, and 4th character from the start character). Therefore, the voice output position in the voice output position storage unit 208 is updated to a page number "5", line count "4", and a character count "4" from the start character of the line, as shown in FIG. 17B.

Figure 16:
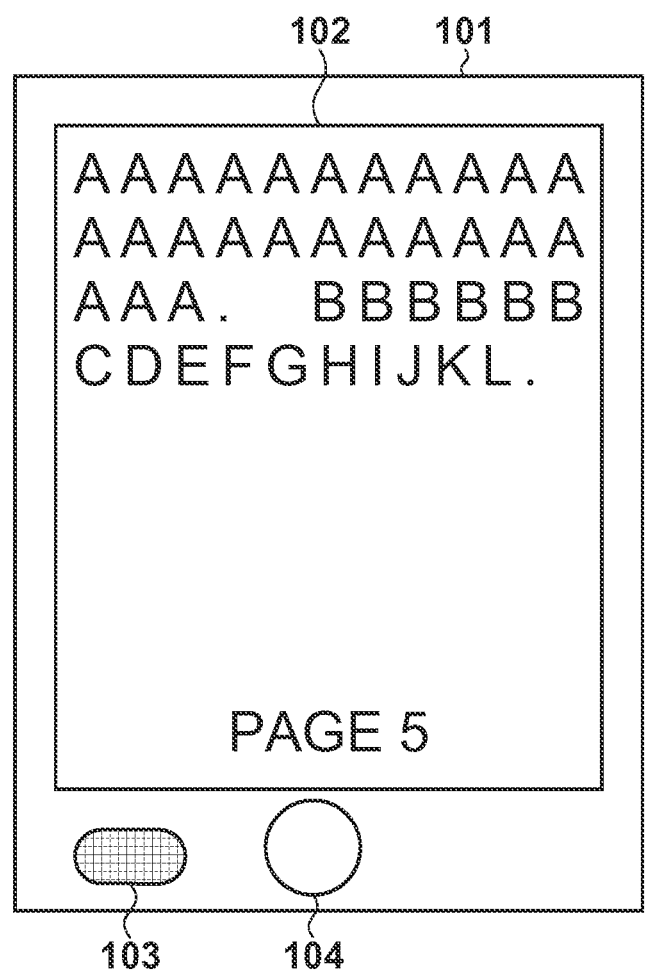
FIG. 16 is a view showing a display example of a touch panel screen 102.

FIG. 16 shows a display example of the page N on the touch panel screen 102. At this time, the voice output unit 203 collates the information in the voice output position storage unit 208 with SMIL description information, and voice-outputs voice waveform data from the start character of "AAAAAAAAAAAAAAAAAAAAAAAAAA." ("A" is a character. However, "A" may be a word.).

In step S405, the voice output unit 203 stops the voice output operation. In step S406, the time specifying unit 204 resets a timer value Z (page visiting time Z: unit=msec) to zero, and starts time measurement. The time measurement may be started simultaneously with a page transition start timing or after completion of transition to the next page.

The time specifying unit 204 checks in step S407 whether or not the timer value Z has reached a predetermined value. As a result of this checking, if the timer value Z has reached the predetermined value (for example, 2000 msec), the process advances to step S411; otherwise, the process advances to step S408. Processes in steps S408 to S410 are the same as those in steps S404 to S406.

When the process advances to step S408, if the input unit 201 detects a left or right flick operation or if the page transition unit 207 detects that a voice output operation has been made for the last character in the transition destination page, the process advances to step S409. Even when the process advances to step S409, the page transition unit 207 specifies a display target page on the touch panel screen 102, and supplies a video signal of the specified page to the display unit 202.

In step S409, the voice output unit 203 stops the voice output operation. However, when the voice output operation has been stopped at this timing, this process is not executed.

In step S410, the time specifying unit 204 resets the timer value Z (page visiting time Z: unit=msec) to zero, and then starts time measurement. The process then returns to step S408.

When the process advances to step S408, if the input unit 201 does not detect any flick operation or if the page transition unit 207 does not detect that the voice output operation has been made for the last character in the transition destination page, the process advances to step S407.

In step S411, the time specifying unit 204 specifies a page which is displayed on the touch panel screen 102 when the process advances to step S411 (a page specified by the page transition unit 207 at this timing) as a page after transition. That is, when a page designation instruction is input during the output operation of voices corresponding to respective characters in the voice output page, the voice output operation is stopped, and a display continuous time of a page designated by the page designation instruction on the touch panel screen 102 is measured. Also, when a page designation instruction is input after the voice output operation is stopped, a display continuous time of a page designated by that page designation instruction on the touch panel screen 102 is measured. Then, the page, this measured continuous time of which exceeds a predetermined time, is determined as a page after transition.

Then, the time specifying unit 204 substitutes a page number of this page after transition in a variable I. Also, the time specifying unit 204 manages, for each page displayed on the touch panel screen 102, the timer value Z measured during a display period of that page, as exemplified in FIG. 18.

The page checking unit 209 checks in step S412 whether or not I=N. As a result of this checking, if I=N, that is, if the page after transition is the page N, the process advances to step S413. On the other hand, if I≠N, the process advances to step S414.

In step S413, the voice output position control unit 205 specifies the last character (the position thereof) in the page N with reference to the voice output position stored in the voice output position storage unit 208. Then, the voice output unit 203 supplies, to the loudspeaker 103, voice signals based on voice waveform data of characters, which include the next character of the last character and those arranged after the next character in the arrangement order of characters in the page N.

For example, assume that the page shown in FIG. 16 is displayed on the touch panel screen 102, and the voice output position storage unit 208 stores the voice output position shown in FIG. 17B. In this case, the voice output operation is performed from a character "G" of the sentence "BBBBBBC-DEFGHIJKL." (each of "B", "C", "D", "E", "F", "G", "H", "I", "J", "K", and "L" is a character. However, each of "B", "C", "D", "E", "F", "G", "H", "I", "J", "K", and "L" may be a word.) in step S413. Note that when the page transition unit 207 detects in step S404 that the voice output operation has been made for the last character of the page N, the voice output unit 203 supplies voice signals based on voice waveform data of characters including the start character and subsequent characters in the page N to the loudspeaker 103.

On the other hand, the page checking unit 209 checks in step S414 whether or not I>N. As a result of this checking, assume that I>N, that is, the page after transition is a subsequent page, a page number of which is larger than the page N. In this case, the process advances to step S415. On the other hand, if I≤N, the process jumps to step S416.

In step S415, the voice output position control unit 205 sets the position of the start character of the page I as a voice output start position. Then, the voice output unit 203 generates voice signals from voice waveform data of characters including the start character and subsequent characters of the page I, and supplies them to the loudspeaker 103.

On the other hand, the time specifying unit 204 checks in step S416 whether or not the timer value Z has reached a predetermined value (for example, 6000 msec). As a result of this checking, if the timer value Z has reached the predetermined value, this processing ends; otherwise, the process returns to step S408.

That is, with the processes in steps S401 to S416, the voice output start position can be automatically specified according to the page after transition. After the page transition, when the page returns to the former page for which voices were output, a voice output position when the page transition was started is determined as a voice output restart position. After the page transition, when the page transits to a page after the former page for which voices were output, the voice output operation is started from the start character of that page. After the page transition, when the page transits to a page before the former page for which voices were output, the voice output operation is stopped.

Figure 5:
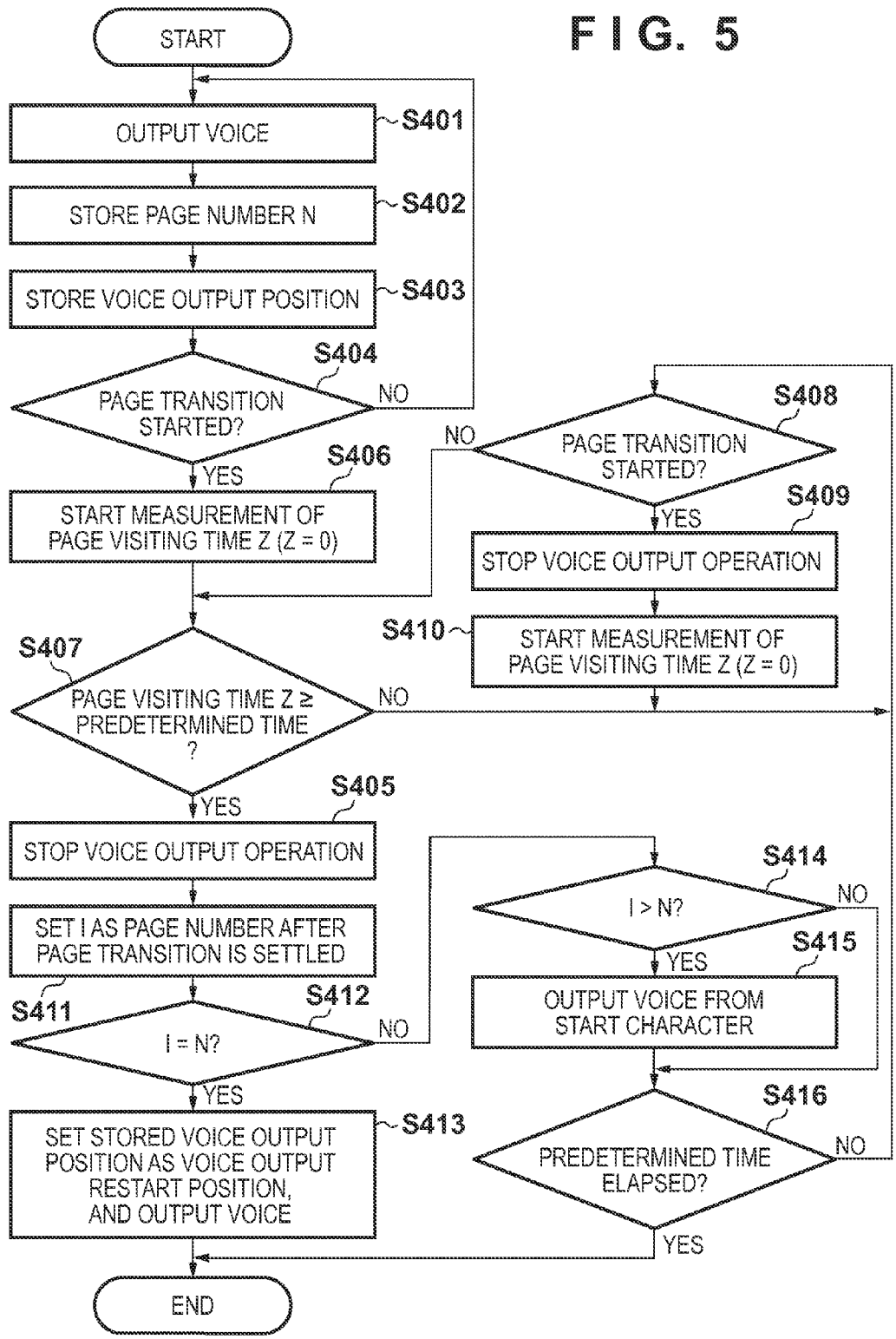
FIG. 5 is a flowchart of the processing to be executed by the information processing apparatus 101.
Figure 6:
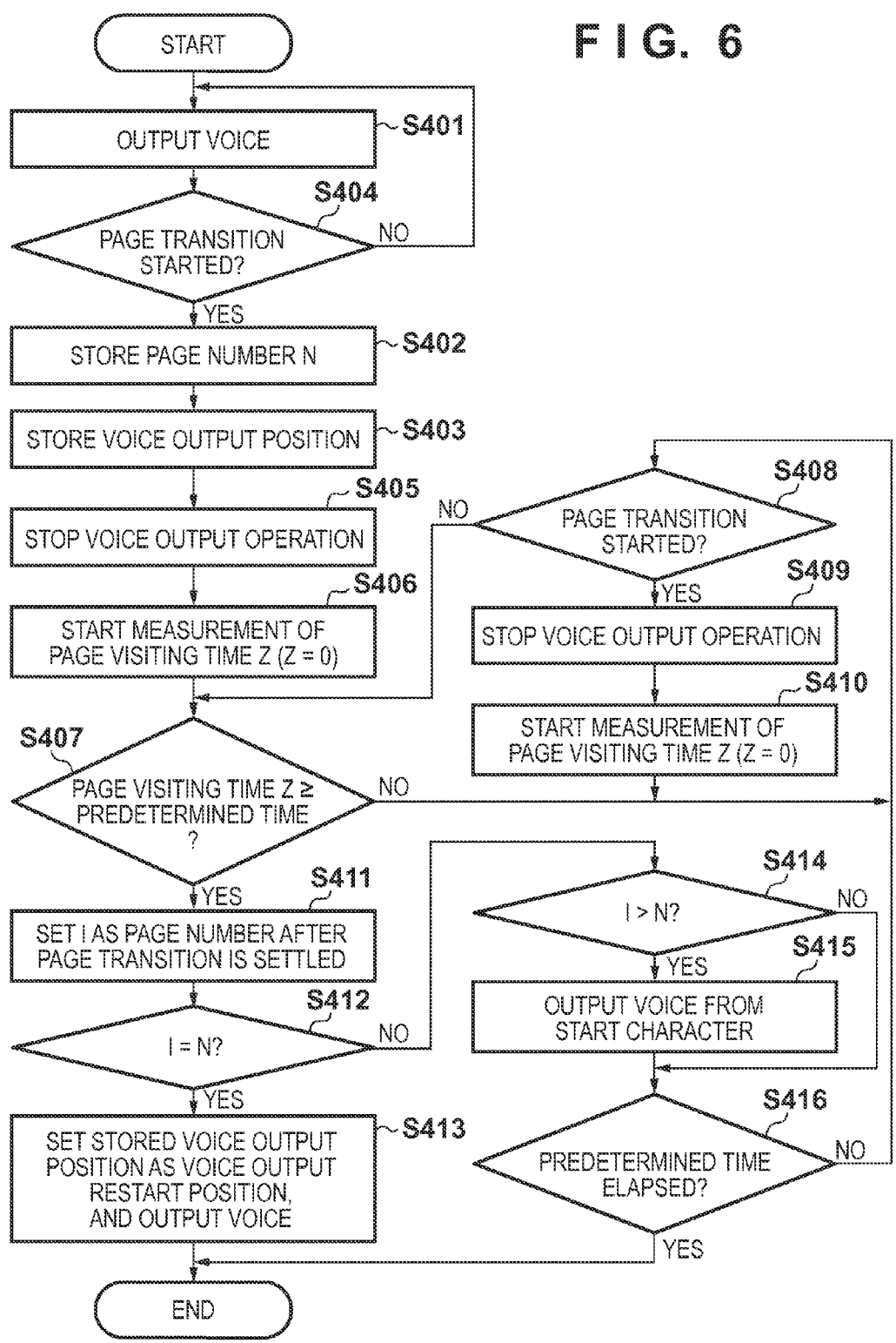
FIG. 6 is a flowchart of the processing to be executed by the information processing apparatus 101.

Note that in place of the processing shown in FIG. 4, as in the processing shown in FIG. 5, the process in step S405 may be executed immediately before step S411. Also, in place of the processing shown in FIG. 4, as in the processing shown in FIG. 6, the processes in steps S402 and S403 may be executed immediately after step S404. In the processing shown in FIG. 6, the page number and voice output position are stored once after the page transition is settled, thus allowing processing cost to be reduced.

Figure 7:
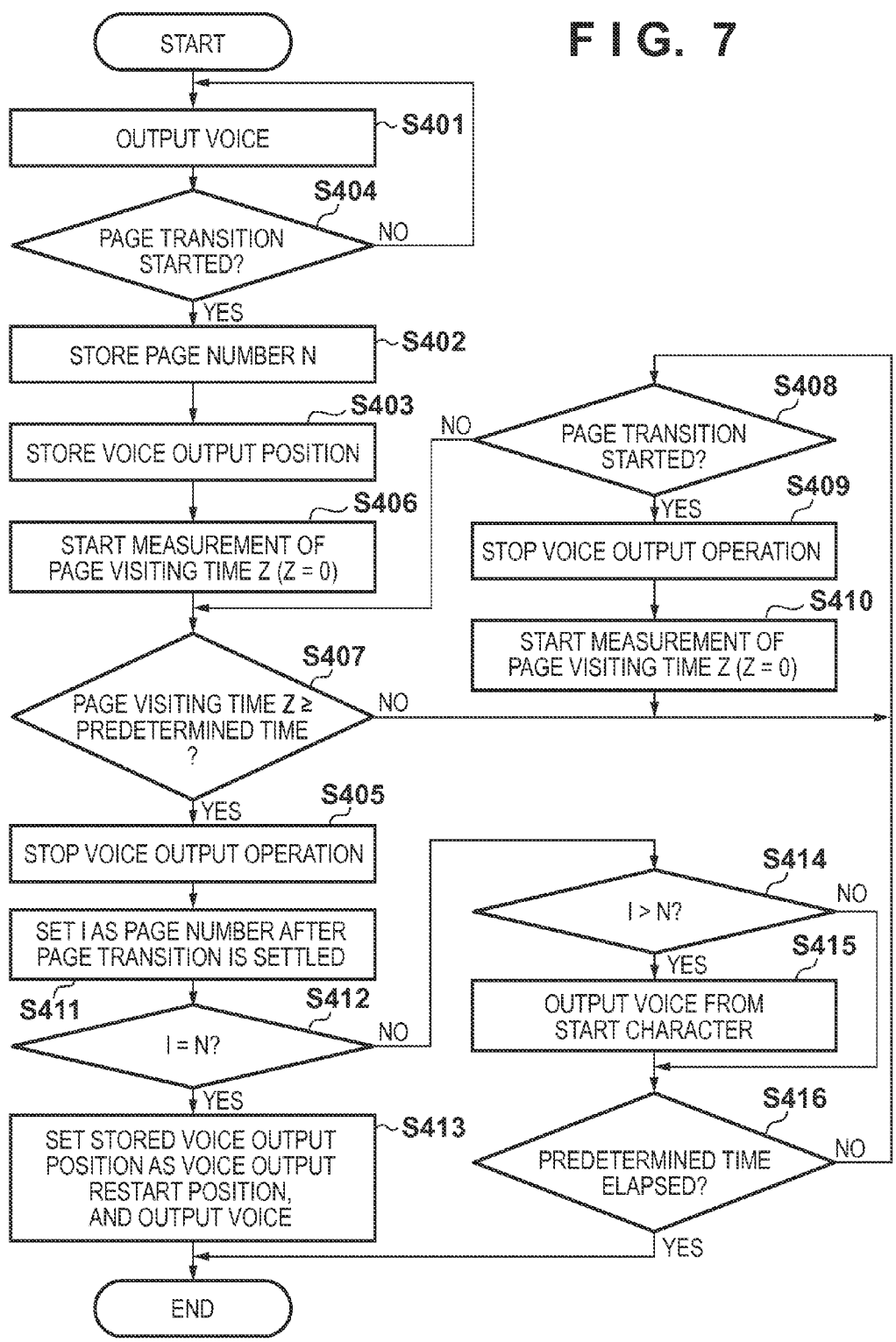
FIG. 7 is a flowchart of the processing to be executed by the information processing apparatus 101.

Furthermore, in place of the processing shown in FIG. 4, as in the processing shown in FIG. 7, the processes in steps S402 and S403 may be executed immediately after step S404, and the process in step S405 may be executed immediately before step S411. In the processing shown in FIG. 7, the page number and voice output position are stored once after the page transition is settled, thus allowing processing cost to be reduced.

As described above, some modifications of this embodiment can be proposed. These modifications satisfy the following arrangement. That is, every time a page designation instruction is input during the voice output period of the voice output page, the display continuous time of the page designated by the input page designation instruction on the touch panel screen 102 is measured. Then, when the page, the measured continuous time of which exceeds the predetermined time, is the voice output page, a character for which a voice was output at the first input timing of the page designation instruction during this period is determined as the last character. Then, voices corresponding to respective characters including the next character of the last character and subsequent characters are sequentially output according to the arrangement order of the characters.

Note that the aforementioned voice output processing, that is, this embodiment in which the voice output operation is stopped when the page transits to a page before a former page for which voices were output after the page transition, is defined as a first voice output mode.

In this embodiment, the page transition is attained by a touch operation. Alternatively, the page transition may be attained by the pressing of a button or the like. The voice output operation is started from a start sentence of a page when pressing of the voice output button 104 is recognized. Alternatively, an arbitrary position on a page may be designated by a touch operation or the like, and the voice output operation may be started from the designated sentence. Voice waveform data obtained by reading an electronic book content aloud are output as voices. Alternatively, voices of an electronic book content may be output by a speech synthesis technique.

However, when the speech synthesis technique is used, the voice output position control unit 205 supplies, to the loudspeaker 103, voice signals based on voice waveform data of characters, which include a character in the vicinity of the next character of the last character and those arranged after that character, in step S413. Since the speech synthesis technique is known to those who are skilled in the art, a description thereof will not be given.

[Second Embodiment]

The first embodiment has explained the first voice output mode in which the voice output operation is stopped when the page transits to a page before a former page for which voices were output after the page transition, as described above. The second embodiment will explain a second voice output mode in which a sentence related to that at the voice output position of the former page is voice-output.

Note that this embodiment also uses the information processing apparatus 101 used in the first embodiment. Differences from the first embodiment will be described below, and the first embodiment will be used as needed unless otherwise specified.

Figure 24:
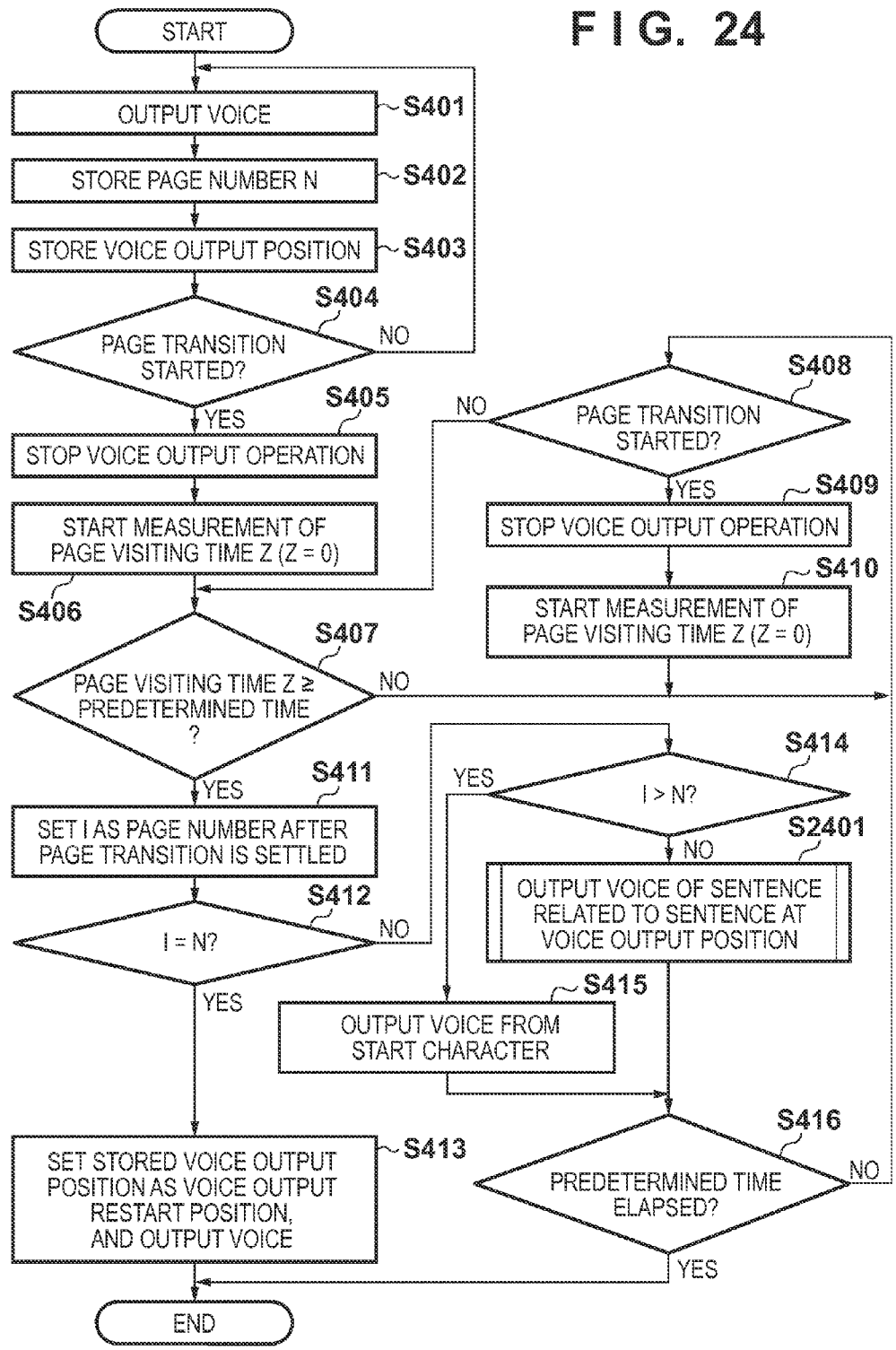
FIG. 24 is a flowchart of the processing to be executed by the information processing apparatus 101.

Voice output processing to be executed by the information processing apparatus 101 according to this embodiment will be described below with reference to FIG. 24 which shows the flowchart of that processing. Assume that in the following description, an N-th (N≥1) page (to be referred to as "page N" hereinafter) in an electronic book content is displayed on the touch panel screen 102, and a voice output operation is not performed yet for this page N. Then, in this state, when the user presses the voice output button 104, processes in step S401 and subsequent steps are started. In the flowchart shown in FIG. 24, if it is determined in step S414 that I≤N, the process advances to step S2401, and after step S2401, the process advances to step S416 unlike in FIG. 4.

In step S2401, the voice output position control unit 205 specifies a sentence related to that to which a character at the voice output position stored in the voice output position storage unit 208 belongs. Then, the voice output unit 203 supplies voice signals based on voice waveform data of respective characters which form the specified sentence to the loudspeaker 103.

When the page transits to a page before the former page, the user often wants to confirm meanings of sentences of the former page. Therefore, by outputting voices of the sentence related to the voice output position of the former page, voices can be output from the voice output position desired by the user.

Details of the processing in step S2401 will be described below with reference to the flowchart shown in FIG. 20. In step S2001, the voice output position control unit 205 specifies a sentence to which the last character belongs from the voice output position stored in the voice output position storage unit 208 by collating with SMIL description information. For example, a sentence "BBBBBBCDEFGHIJKL." is specified from FIG. 16.

In step S2002, the voice output position control unit 205 specifies nouns in the sentence specified in step S2001. Nouns are specified using a known technique such as morphemic analysis. Since this morphemic analysis is a known technique, a description thereof will not be given. Nouns "CD" and "GH" are specified from the sentence "BBBBBBCDEFGHIJKL.".

The voice output position control unit 205 checks in step S2003 whether or not a page after transition (previous page) includes the nouns specified in step S2002. This checking process also uses the morphemic analysis. As a result of this checking, if the specified nouns are included, the process advances to step S2004; otherwise, the process advances to step S2005.

In step S2005, the voice output position control unit 205 determines a position of a start character of a page I as the voice output start position. Then, the voice output unit 203 generates voice signals from voice waveform data of respective characters including the start character and subsequent characters of the page I, and supplies them to the loudspeaker 103. In step S2004, the voice output position control unit 205 determines a position of a start character of a sentence including the nouns specified in step S2002 as the voice output start position. Then, the voice output unit 203 generates voice signals from voice waveform data of respective characters including the start character and subsequent characters of this sentence, and supplies them to the loudspeaker 103.

Figure 25:
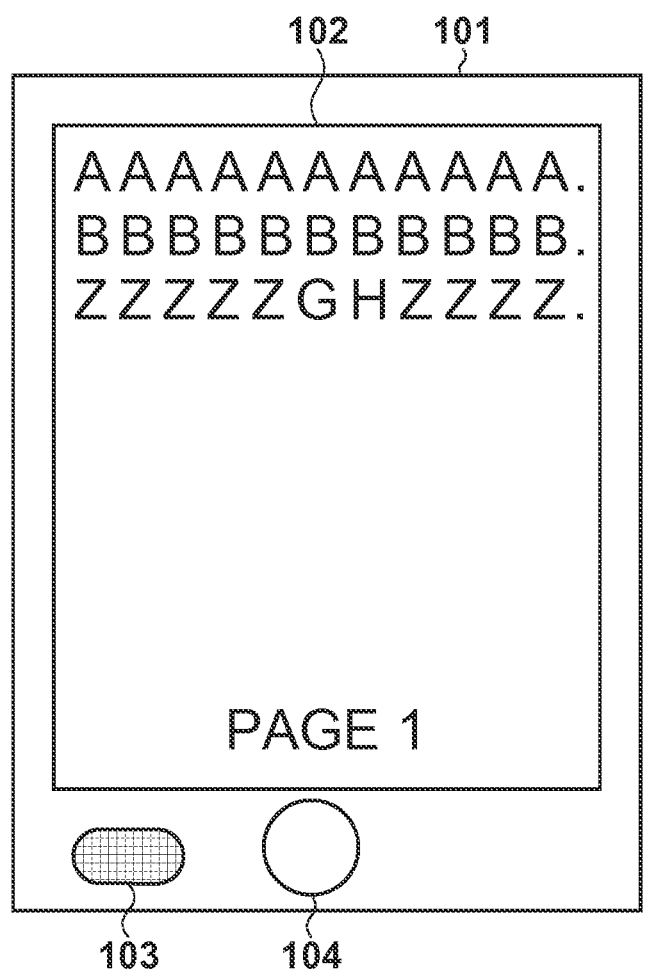
FIG. 25 is a view showing a display example of the touch panel screen 102.

For example, assume that a screen shown in FIG. 25 is displayed on the touch panel screen 102 as the page after transition. In this case, a sentence "ZZZZZGHZZZZ." ("Z" is a character. However, "Z" may be a word.) includes the noun "GH". Therefore, voices are output in turn from a start character of the sentence "ZZZZZGHZZZZ." including the noun "GH".

Figure 20:
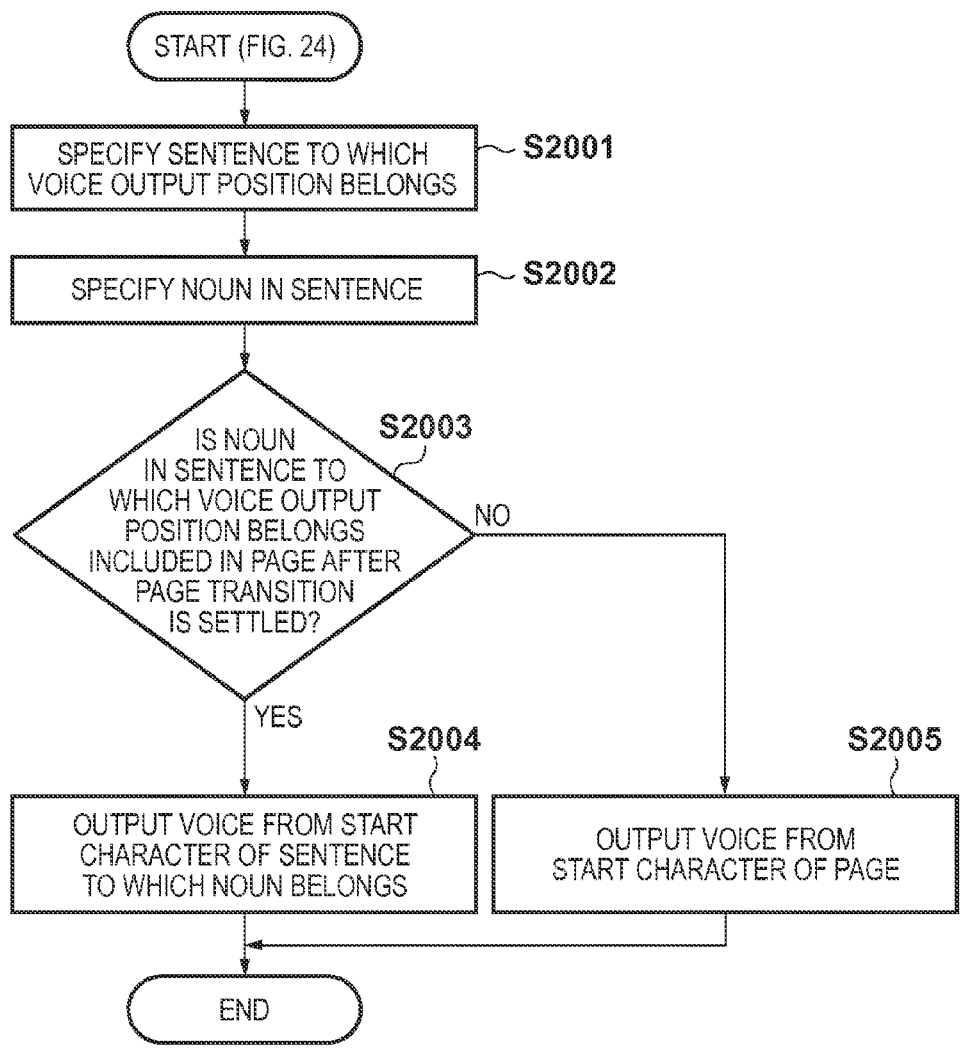
FIG. 20 is a flowchart of the processing in step S2401.

Note that in step S2401, the processing of the flowchart shown in FIG. 21 may be executed in place of that of the flowchart shown in FIG. 20. In FIG. 21, the same step numbers denote the same processing steps in FIG. 20, and a description thereof will not be repeated.

The voice output position control unit 205 checks in step S2103 whether or not a title (title sentence) of a paragraph in the page after transition includes the noun specified in step S2002. This checking process also uses the morphemic analysis. As a result of this checking, if the specified noun is included, the process advances to step S2104; otherwise, the process advances to step S2005.

Figure 26:
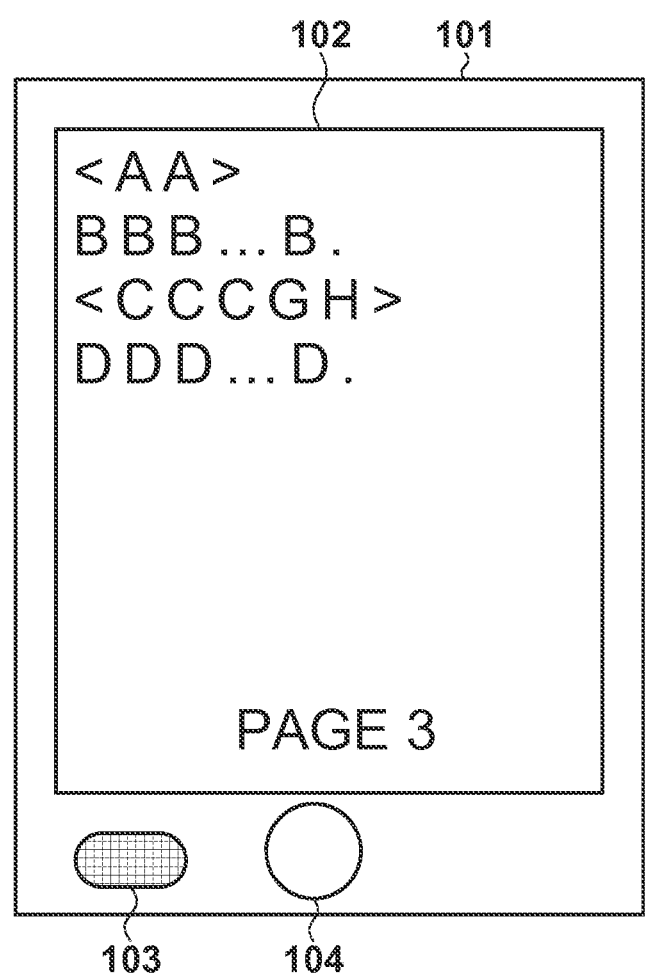
FIG. 26 is a view showing a display example of the touch panel screen 102.

For example, when a screen shown in FIG. 26 is displayed on the touch panel screen 102, a title "CCCGH" includes the noun "GH". In this case, the process in step S2104 is executed. Information of a title can be acquired from the SMIL description information.

In step S2104, the voice output position control unit 205 determines a position of a start character of a title including the noun specified in step S2002 in the page I as the voice output start position. Then, the speech output unit 203 generates voice signals from voice waveform data of respective characters including the start character and subsequent characters of this title, and supplies them to the loudspeaker 103. In case of FIG. 26, voices are output from the start character of "CCCGH" as the title of the paragraph.

Figure 27:
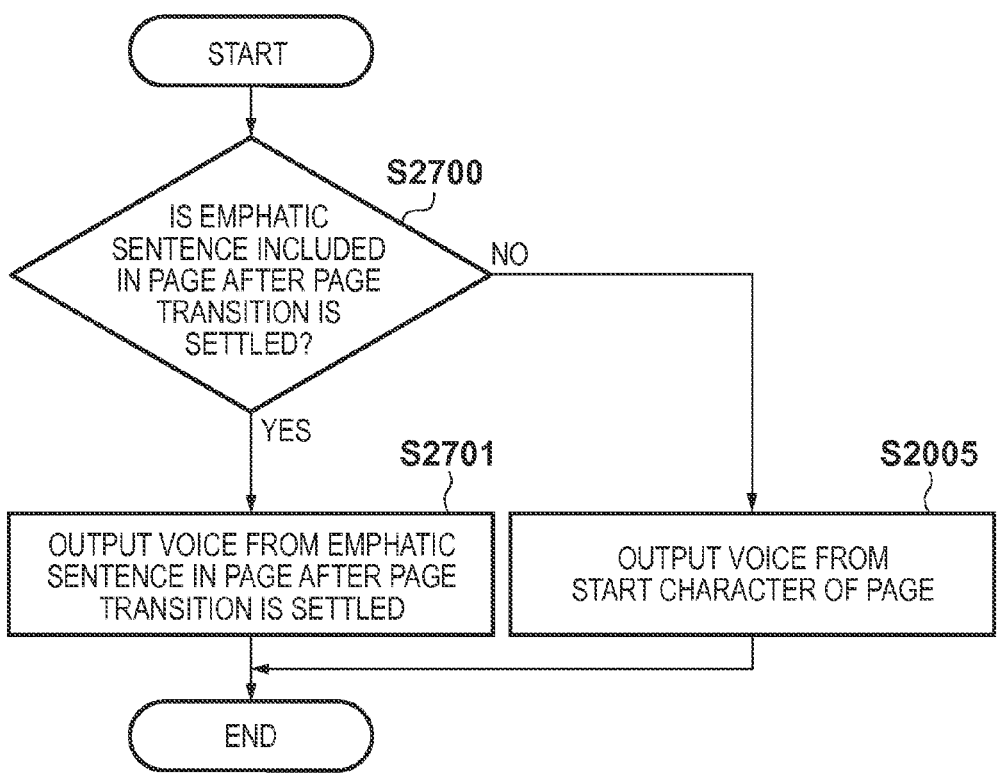
FIG. 27 is a flowchart of the processing in step S2401.

Alternatively, in step S2401, the processing shown in the flowchart of FIG. 27 may be executed. In FIG. 27, the same step numbers denote the same processing steps as in FIG. 20, and a description thereof will not be repeated.

Figure 28:
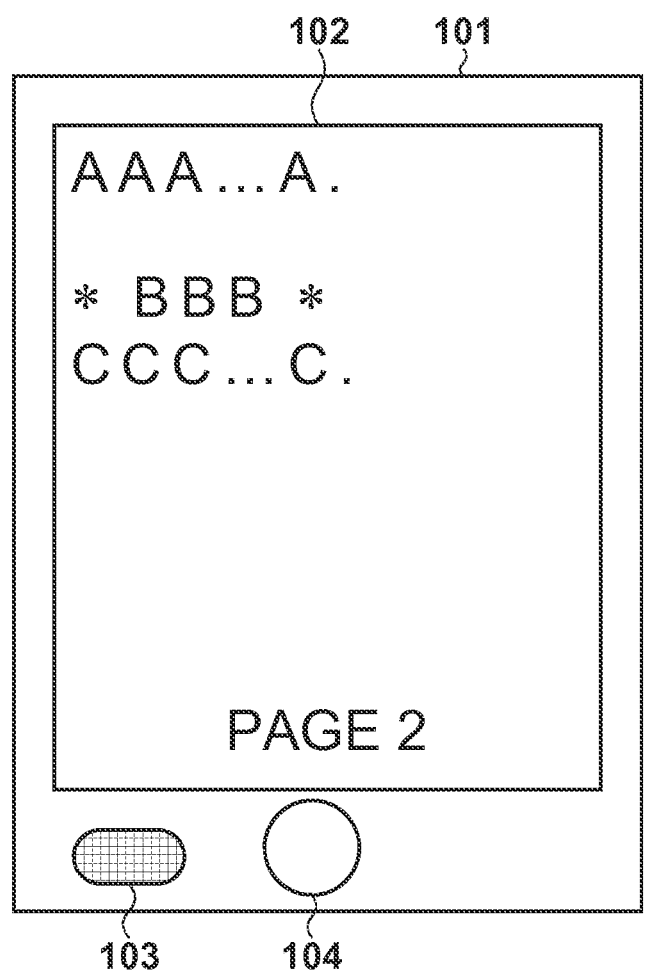
FIG. 28 is a view showing a display example of the touch panel screen 102.

The voice output position control unit 205 checks in step S2700 whether or not the page after transition includes an emphatic sentence (an example of a sentence of a specific type). As a result of this checking, if such sentence is included, the process advances to step S2701; otherwise, the process advances to step S2005. For example, when a screen shown in FIG. 28 is displayed on the touch panel screen 102, sentences in that screen includes "BBB" as an emphatic sentence. In this case, the process in step S2701 is executed. Information of an emphatic sentence can be acquired from the SMIL description information.

In step S2701, the voice output position control unit 205 determines a position of a start character of the emphatic sentence in the page I as the voice output start position. Then, the voice output unit 203 generates voice signals from voice waveform data of respective characters including the start character and subsequent characters of this emphatic sentence, and supplies them to the loudspeaker 103.

[Third Embodiment]

The third embodiment will explain a third voice output mode in which a voice output start position is controlled according to a page transition time in addition to a page after page transition. Note that this embodiment also uses the information processing apparatus 101 used in the first embodiment. Differences from the first embodiment will be described below, and the first embodiment is used as needed unless otherwise specified.

Figure 22A:
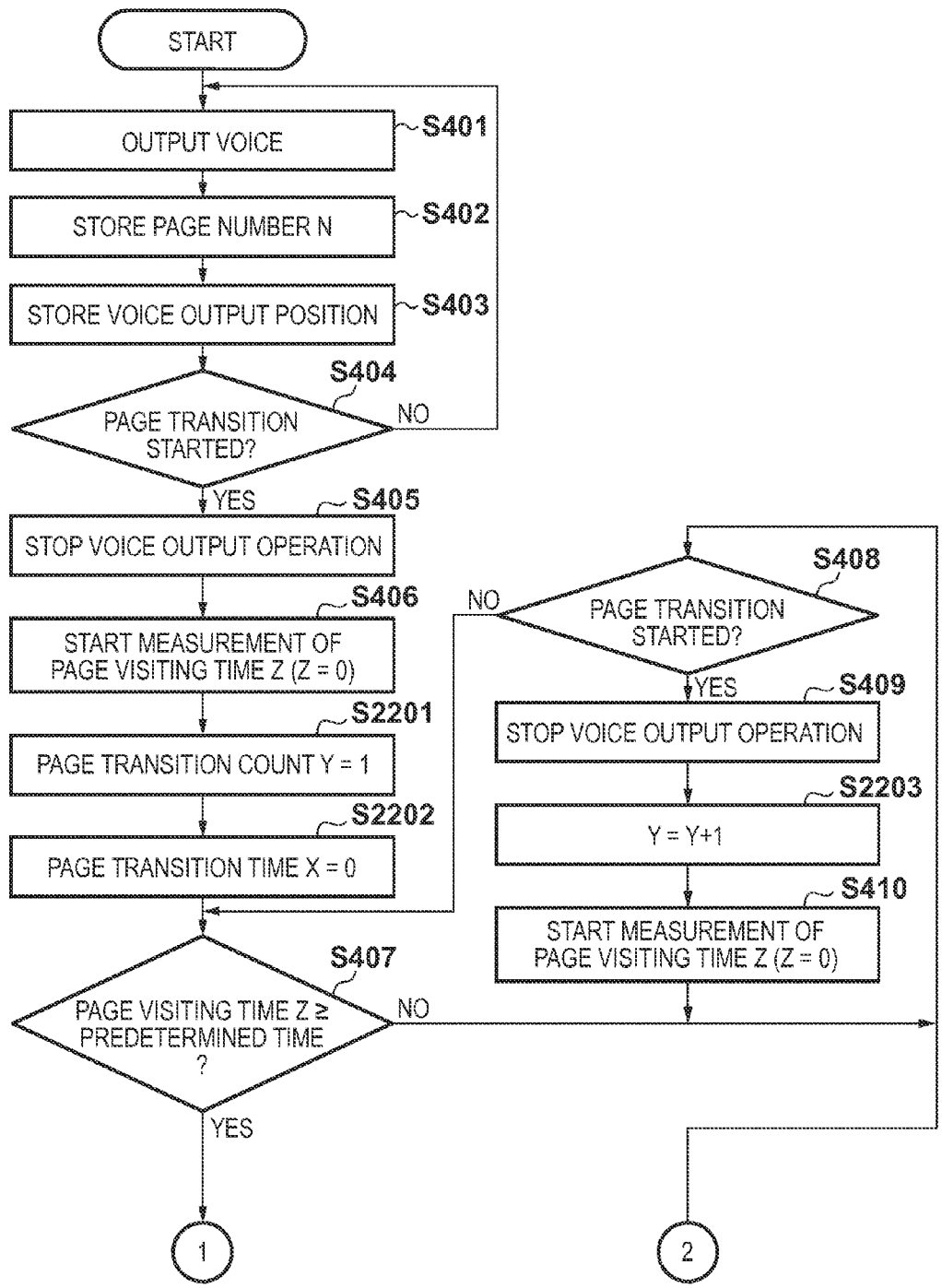
FIGS. 22A and 22B are flowcharts of the processing to be executed by the information processing apparatus 101.
Figure 22B:
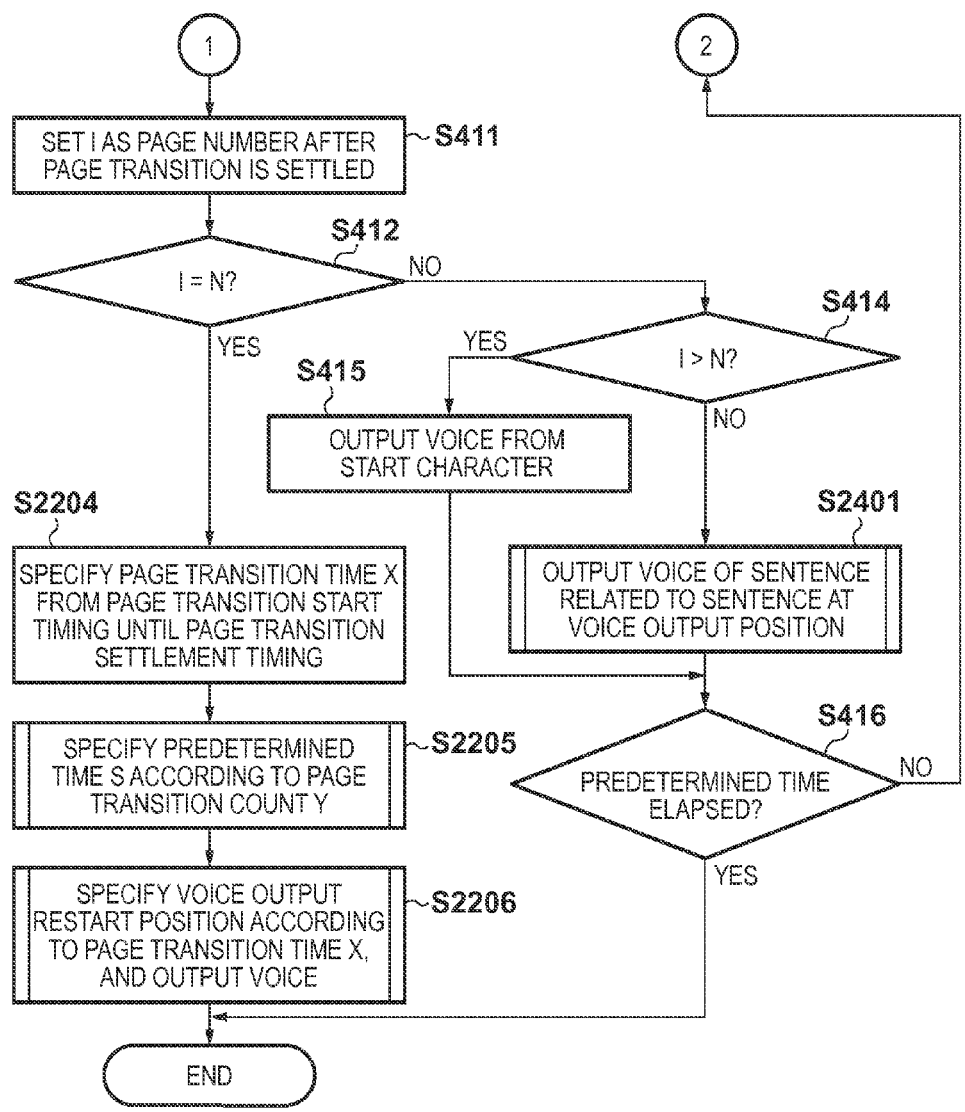

Voice output processing to be executed by the information processing apparatus 101 according to this embodiment will be described below with reference to FIGS. 22A and 22B each of which shows the flowchart of that processing. Assume that in the following description, an N-th (N≥1) page (to be referred to as "page N" hereinafter) in an electronic book content is displayed on the touch panel screen 102, and a voice output operation is not performed yet for this page N. Then, in this state, when the user presses the voice output button 104, processes in step S401 and subsequent steps are started. In FIGS. 22A and 22B, the same step numbers denote the same processing steps as in FIGS. 4 and 24, and a description thereof will not be repeated. In this embodiment, the time specifying unit 204 manages, for each page displayed on the touch panel screen 102, a timer value Z measured during a display period of that page, as exemplified in FIG. 19.

In step S2201, the page transition unit 207 initializes a variable Y indicating a page transition count to 1. In step S2202, the time specifying unit 204 initializes a timer value X required to measure a page transition time (unit=msec) to 0, and then starts time measurement. In step S2203, the page transition unit 207 increments the value of the variable Y by 1.

That is, page designation instructions input during an interval from a first detection timing of a page designation instruction during a voice output period for a voice output page to a timing at which a measured continuous time exceeds a predetermined time are counted as the value of the variable Y.

Also, an elapsed time since the input unit 201 detects a flick operation during a display period of the page N is measured as the timer value X.

In step S2204, the page transition unit 207 stops time measurement of the timer required to measure the page transition time, and acquires the timer value X. For example, assume that X=5800 msec.

In step S2205, the page transition unit 207 calculates a predetermined time S using the value of the variable Y. Various methods of calculating the predetermined time S using the value of the variable Y are available, and some methods will be described later.

In step S2206, the voice output position control unit 205 determines a voice output start position in a page I according to the timer value X. Then, the voice output unit 203 generates voice signals from voice waveform data of respective characters, which include a character at this determined voice output start position and subsequent characters in the page I, and supplies them to the loudspeaker 103.

Figure 11:
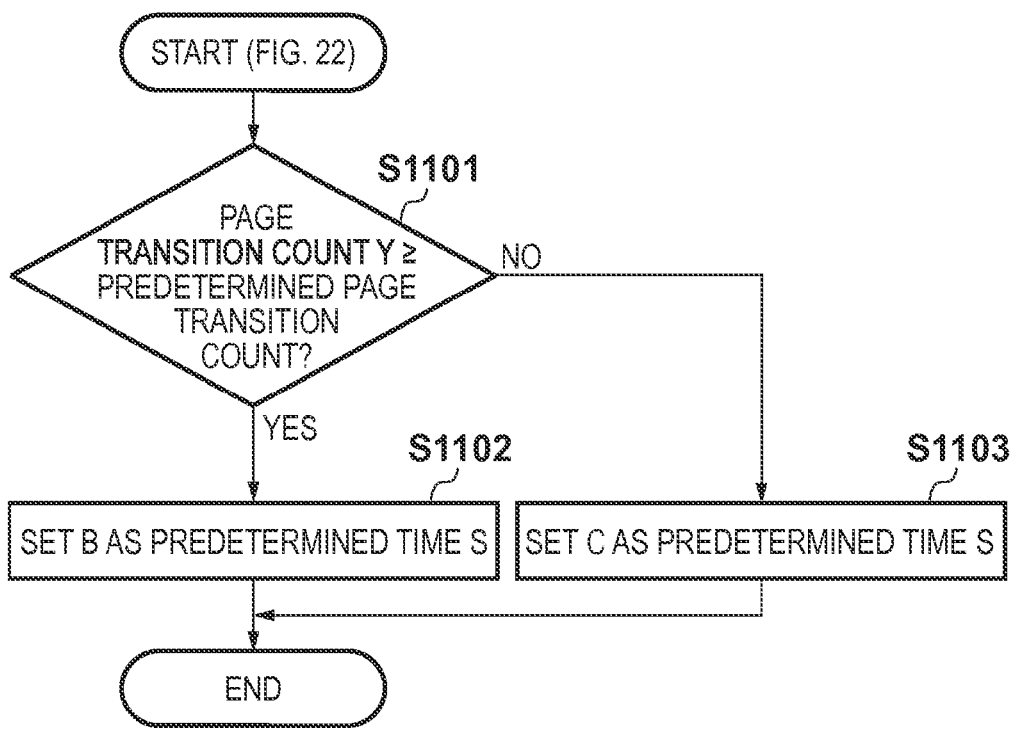
FIG. 11 is a flowchart of the processing in step S2205.

An example of the processing to be executed in step S2205 will be described below with reference to the flowchart shown in FIG. 11. The page transition unit 207 checks in step S1101 whether or not the value of the variable Y is equal to or larger than a predetermined value. As a result of this checking, if the value of the variable Y is equal to or larger than the predetermined value, the process advances to step S1102; otherwise, the process advances to step S1103.

In step S1102, the page transition unit 207 sets a predetermined value B (for example, 8000 msec) as the predetermined time S. In step S1103, the page transition unit 207 sets a predetermined value C (<B: for example, 3000 msec) as the predetermined time S.

Figure 12:
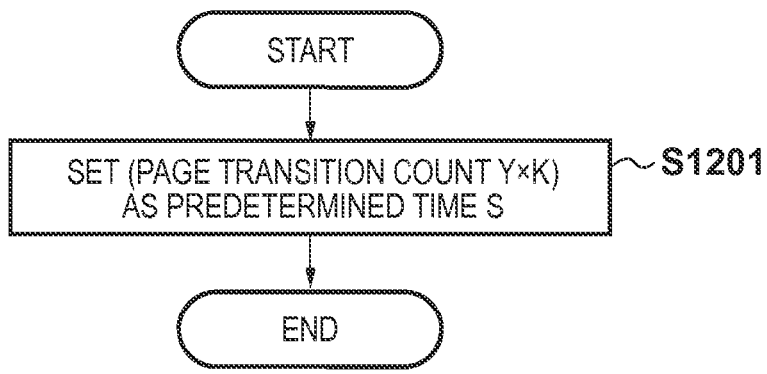
FIG. 12 is a flowchart of the processing in step S2205.

Another example of the processing to be executed in step S2205 will be described below with reference to the flowchart shown in FIG. 12. In step S1201, the page transition unit 207 sets a product of the value of the variable Y and an arbitrary coefficient K as the predetermined time S. That is, this predetermined time S is calculated so as to increase the predetermined time S with increasing value of the variable Y.

Figure 8:
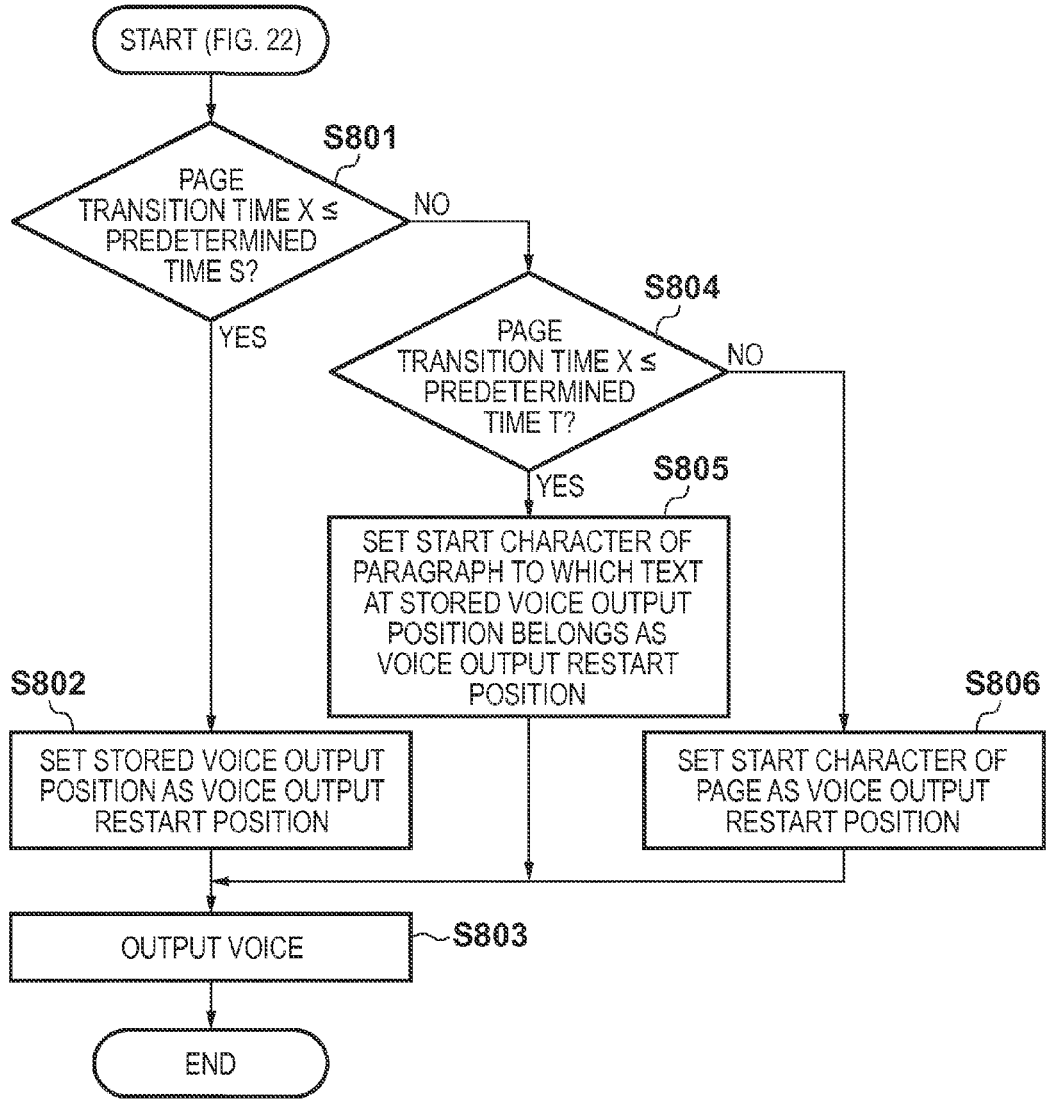
FIG. 8 is a flowchart of the processing in step S2206.

Details of the processing in step S2206 above will be described below with reference to FIG. 8 which shows the flowchart of that processing.

The voice output position control unit 205 checks in step S801 whether or not the timer value X is equal to or less than the predetermined time S (first threshold). As a result of this checking, if the timer value X is equal to or less than the predetermined time S, the process advances to step S802; otherwise, the process advances to step S804.

In step S802, the voice output position control unit 205 specifies the last character (the position thereof) in the page N with reference to the voice output position stored in the voice output position storage unit 208. Then, in step S803, the voice output unit 203 supplies, to the loudspeaker 103, voice signals based on voice waveform data of characters, which include the next character of the last character and those arranged after the next character in the arrangement order of characters in the page N.

On the other hand, the voice output position control unit 205 check in step S804 whether or not the timer value X is equal to or smaller than T (which meets T>S, and for example, T=2×S) as a second threshold (that is, whether or not S<X≤T). As a result of this checking if S<X≤T, the process advances to step S805; if X>T, the process advances to step S806.

In step S805, the voice output position control unit 205 specifies the last character (the position thereof) in the page N with reference to the voice output position stored in the voice output position storage unit 208. Then, the voice output position control unit 205 specifies a start sentence of a paragraph to which this last character in the page N belongs. In step S803, the voice output unit 203 supplies, to the loudspeaker 103, voice signals based on voice waveform data of characters, which include the start character and those arranged after the start character in the arrangement order of characters in this specified sentence in the page N.

In step S806, the voice output position control unit 205 specifies a start character in the page N. Then, in step S803, the voice output unit 203 supplies, to the loudspeaker 103, voice signals based on voice waveform data of characters, which include the start character and those arranged after the start character in the page N.

That is, when the user returns to a page within a short period of time for the purpose of short confirmation or the like, a voice output operation interrupted at the page transition start timing can be restarted. When the user returns to a page after a long period of time, as in a case in which the user reads another page thoroughly and then returns to the page, a voice output operation can be restarted from a start character of that page again. Also, when the user returns to a page after an elapse of a predetermined period of time for the purpose of certain confirmation, a voice output operation interrupted at the page transition start timing can be restarted from a start character of a paragraph.

Figure 9:
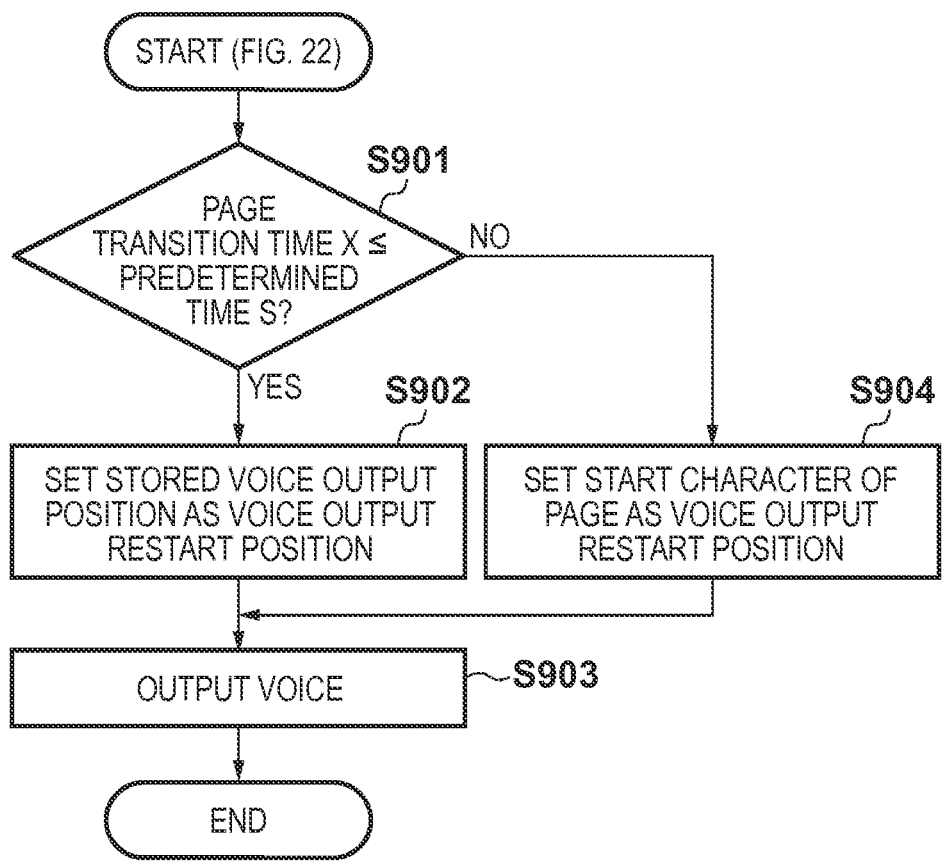
FIG. 9 is a flowchart of the processing in step S2206.

Note that in step S2206 above, processing according to the flowchart shown in FIG. 9 may be executed. The voice output position control unit 205 checks in step S901 whether or not the timer value X is equal to or less than the predetermined time S. As a result of this checking, if the timer value X is equal to or less than the predetermined time S, the process advances to step S902; otherwise, the process advances to step S904.

In step S902, the voice output position control unit 205 specifies the last character (the position thereof) in the page N with reference to the voice output position stored in the voice output position storage unit 208. Then, in step S903, the voice output unit 203 supplies, to the loudspeaker 103, voice signals based on voice waveform data of characters, which include the next character of the last character and those arranged after the next character in the arrangement order of characters in the page N.

On the other hand, in step S904, the voice output position control unit 205 specifies a start character in the page N. Then, in step S903, the voice output unit 203 supplies, to the loudspeaker 103, voice signals based on voice waveform data of characters, which include the start character and those arranged after the start character in the page N.

That is, when the user returns to a page within a short period of time for the purpose of short confirmation or the like, a voice output operation interrupted at the page transition start timing can be restarted. When the user returns to a page after a long period of time, as in a case in which the user reads another page thoroughly and then returns to the page, a voice output operation can be restarted from a start character of that page again.

Figure 10:
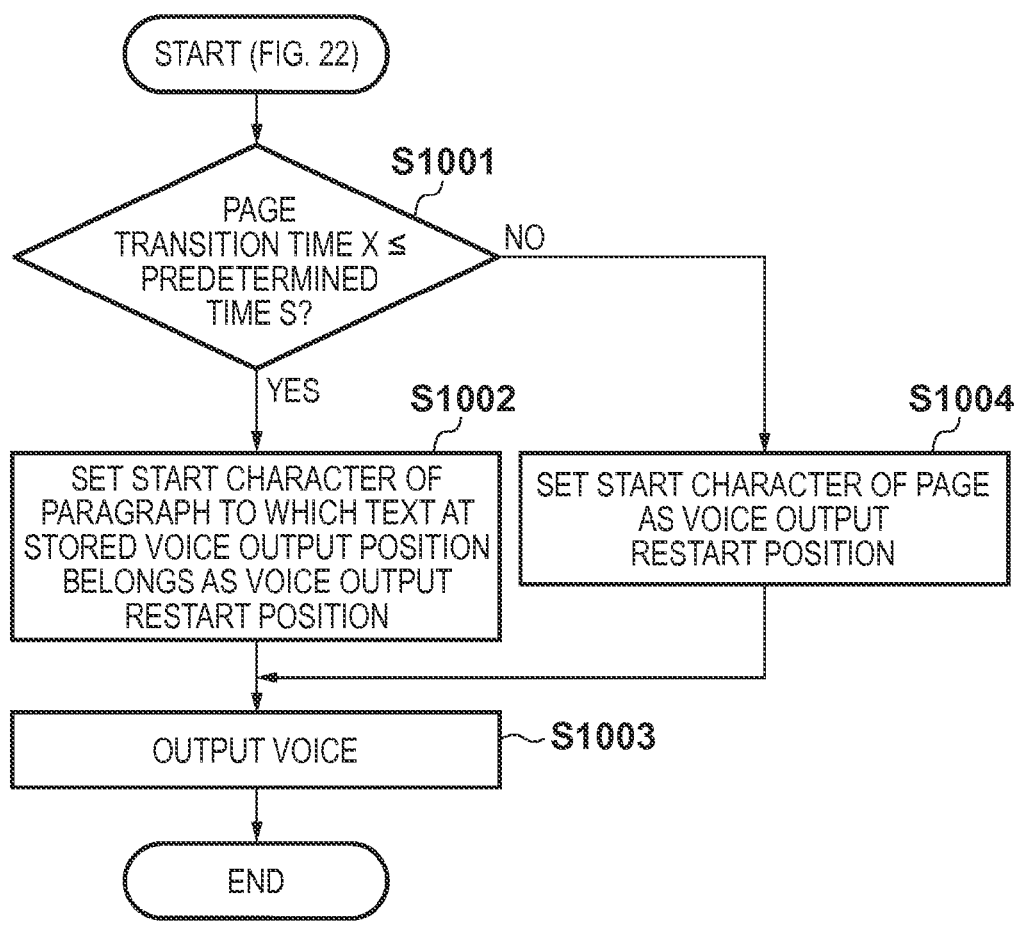
FIG. 10 is a flowchart of the processing in step S2206.

Furthermore, in step S2206, the processing according to the flowchart shown in FIG. 10 may be executed. The voice output position control unit 205 checks in step S1001 whether or not the timer value X is equal to or less than the predetermined time S. As a result of this checking, if the timer value X is equal to or less than the predetermined time S, the process advances to step S1002; otherwise, the process advances to step S1004.

In step S1002, the voice output position control unit 205 specifies the last character (the position thereof) in the page N with reference to the voice output position stored in the voice output position storage unit 208. Then, the voice output position control unit 205 specifies a start sentence of a paragraph to which this last character belongs in the page N. In step S1003, the voice output unit 203 supplies, to the loudspeaker 103, voice signals based on voice waveform data of characters, which include the start character and those arranged after the start character in the arrangement order of characters in this specified sentence in the page N.

On the other hand, in step S1004, the voice output position control unit 205 specifies a start character in the page N. Then, in step S1003, the voice output unit 203 supplies, to the loudspeaker 103, voice signals based on voice waveform data of characters, which include the start character and those arranged after the start character in page N.

That is, when the user returns to a page after a long period of time, as in a case in which the user reads another page thoroughly and then returns to the page, a voice output operation can be restarted from a start character of that page again. Also, when the user returns to a page after an elapse of a predetermined period of time for the purpose of certain confirmation, a voice output operation interrupted at the page transition start timing can be restarted from a start character of a paragraph.

Figure 13:
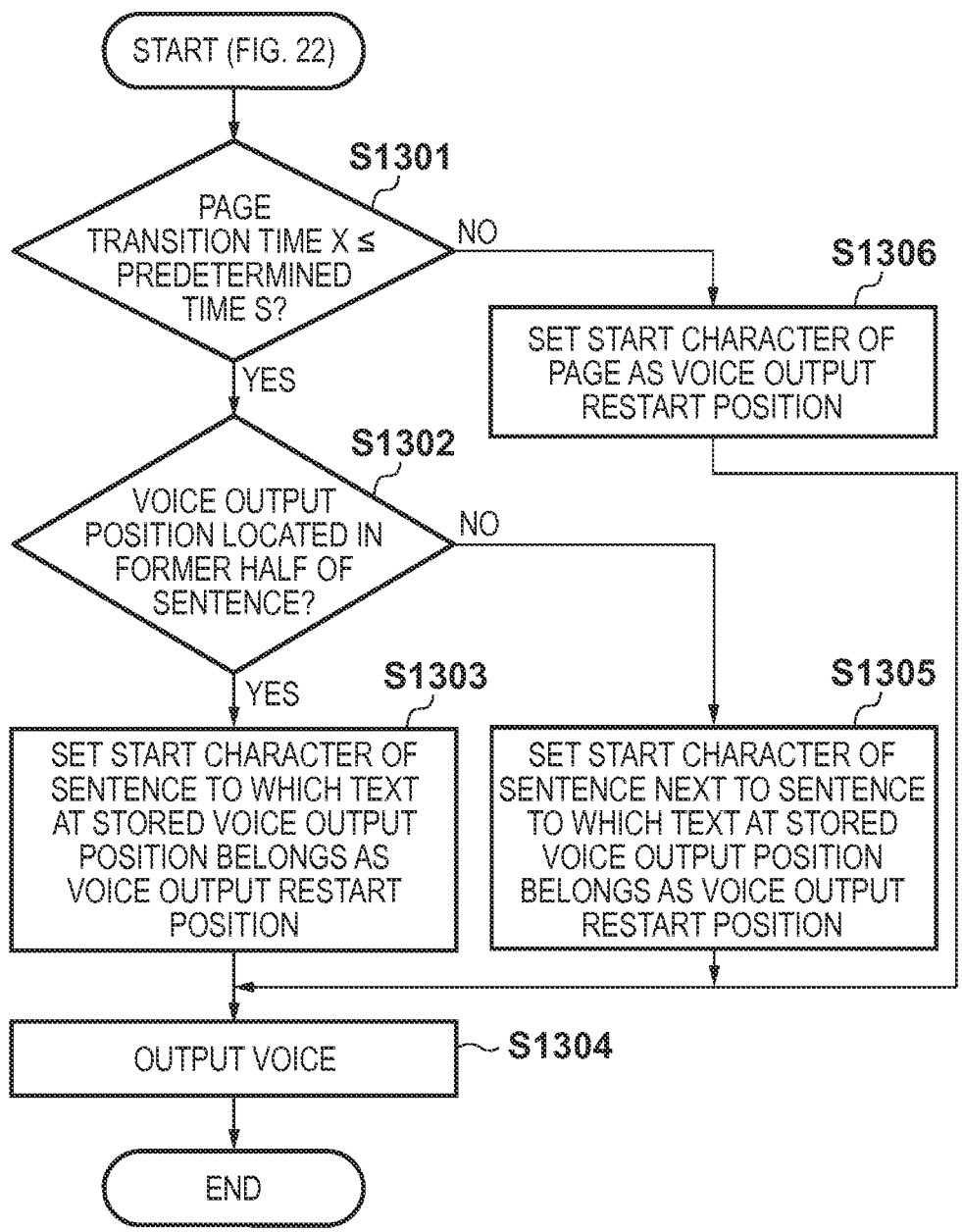
FIG. 13 is a flowchart of the processing in step S2206.

In step S2206 above, the processing according to the flowchart shown in FIG. 13 may be executed.

The voice output position control unit 205 checks in step S1301 whether or not the timer value X is equal to or less than the predetermined time S. As a result of this checking, if the timer value X is equal to or less than the predetermined time S, the process advances to step S1302; otherwise, the process advances to step S1306.

The voice output position control unit 205 checks in step S1302 with reference to the voice output position stored in the voice output position storage unit 208 whether or not the last character (the position thereof) in the page N is located in the former half of a sentence to which the last character belongs. As a result of this checking, if the last character is located in the former half, the process advances to step S1303; if the last character is located in the latter half, the process advances to step S1305. Details of the processing in step S1302 will be described later with reference to FIG. 14.

In step S1303, the voice output position control unit 205 specifies the last character (the position thereof) in the page N with reference to the voice output position stored in the voice output position storage unit 208. Then, the voice output position control unit 205 specifies a sentence to which this last character belongs in the page N. In step S1304, the voice output unit 203 supplies, to the loudspeaker 103, voice signals based on voice waveform data of characters, which include the start character and those arranged after the start character in the arrangement order of characters in this specified sentence in the page N.

In step S1305, the voice output position control unit 205 specifies the last character (the position thereof) in the page N with reference to the voice output position stored in the voice output position storage unit 208. Then, the voice output position control unit 205 specifies a next sentence of a sentence to which this last character belongs in the page N. In step S1304, the voice output unit 203 supplies, to the loudspeaker 103, voice signals based on voice waveform data of characters, which include the start character and those arranged after the start character in the arrangement order of characters in this specified sentence in the page N.

In step S1306, the voice output position control unit 205 specifies a start character in the page N. Then, in step S1304, the voice output unit 203 supplies, to the loudspeaker 103, voice signals based on voice waveform data of characters, which include the start character and those arranged after the start character in the page N.

That is, when the user returns a page within a short period of time, and the voice output position at the page transition start timing is located in the former half of the sentence, a voice output operation can be restarted from the start character of that sentence. On the other hand, when the voice output position at the page transition start timing is located in the latter half of the sentence, a voice output operation can be restarted from the next sentence of that sentence.

Figure 14:
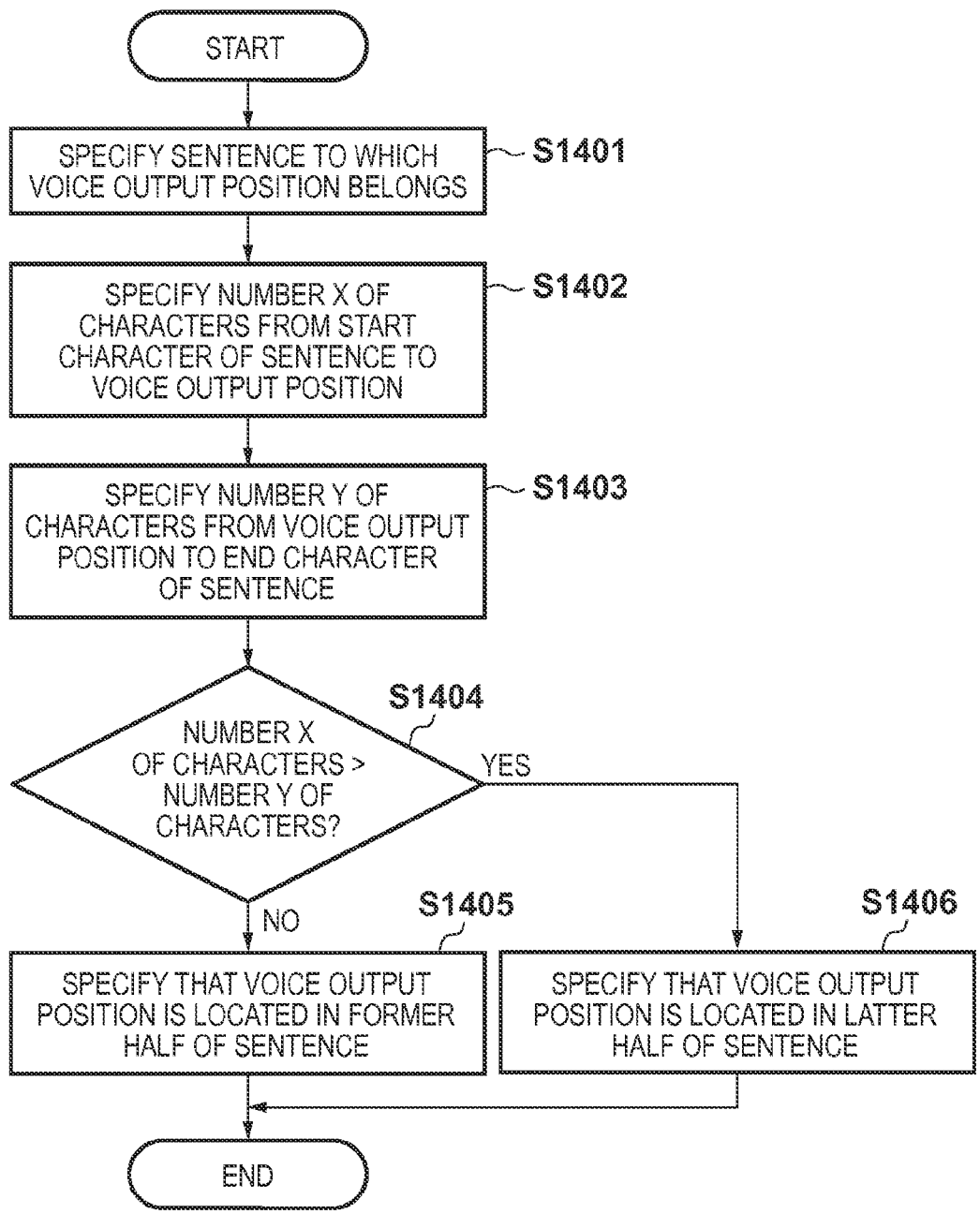
FIG. 14 is a flowchart of the processing in step S1302.

The processing in step S1302 above will be described below with reference to the flowchart shown in FIG. 14.

In step S1401, the voice output position control unit 205 specifies a sentence to which the last character (the position thereof) in the page N belongs with reference to the voice output position stored in the voice output position storage unit 208.

In step S1402, the voice output position control unit 205 counts the number X of characters from a start character of the sentence specified in step S1401 to the last character in the page N. In step S1403, the voice output position control unit 205 counts the number Y of characters from an end character of the sentence specified in step S1401 to the last character in the page N.

The voice output position control unit 205 checks in step S1404 whether or not X>Y. As a result of this checking, if X>Y, the process advances to step S1406; if X≤Y, the process advances to step S1405.

In step S1405, the voice output position control unit 205 determines that the last character is located in the former half. In step S1406, the voice output position control unit 205 determines that the last character is located in the latter half.

[Fourth Embodiment]

Figure 23:
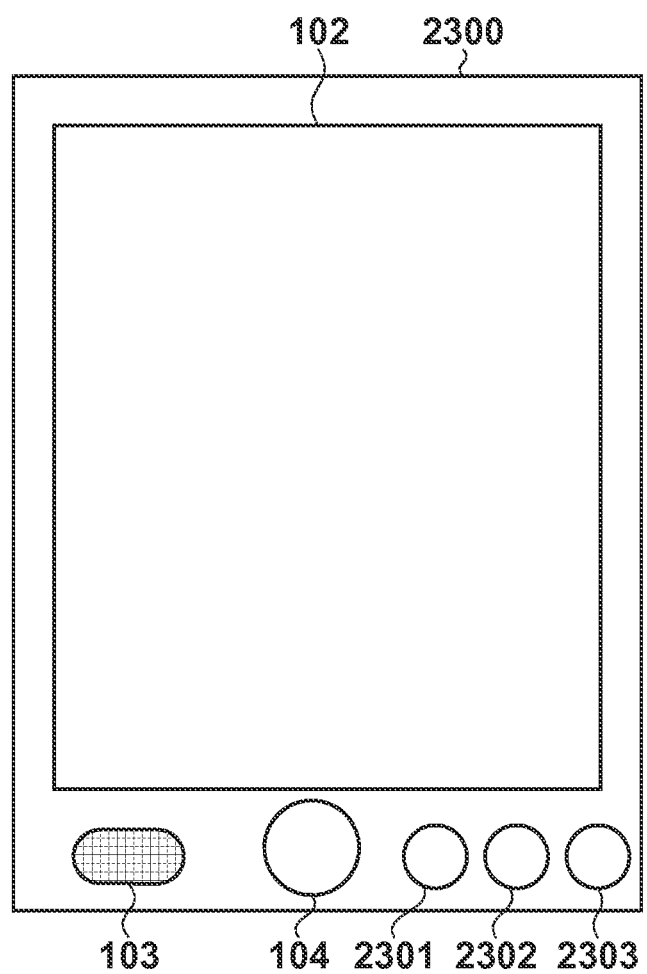
FIG. 23 is a view showing an example of the outer appearance of the information processing apparatus 2300.

The first to third embodiments have respectively explained the first to third voice output modes. In this embodiment, the first to third voice output modes are selectively used. FIG. 23 shows an example of the outer appearance of an information processing apparatus 2300 according to this embodiment. In FIG. 23, the same reference numerals denote the same components as those shown in FIG. 1, and a description thereof will not be repeated.

Buttons 2301 to 2303 are those to be pressed to respectively designate the first voice output mode, second voice output mode, and third voice output mode. Note that the method of designating the first to third voice output modes is not limited to this. For example, every time one button is pressed, the mode may be switched, or button images used to designate the respective modes may be displayed on a touch panel screen 102.

An example of the functional arrangement of the information processing apparatus 2300 according to this embodiment will be described below with reference to the block diagram shown in FIG. 29. Note that in FIG. 29, the same reference numerals denote the same components as those shown in FIG. 2, and a description thereof will not be repeated.

An input unit 201 detects not only operation inputs from a voice output button 104 and the touch panel screen 102 but also pressing of each of the buttons 2301 to 2303. A mode switching unit 2901 sets the mode according to the pressed one of the buttons 2301 to 2303. That is, the mode switching unit 2901 sets the first voice output mode when the input unit 201 detects pressing of the button 2301. Also, the mode switching unit 2901 sets the second voice output mode when the input unit 201 detects pressing of the button 2302. Furthermore, the mode switching unit 2901 sets the third voice output mode when the input unit 201 detects pressing of the button 2303.

Figure 15:
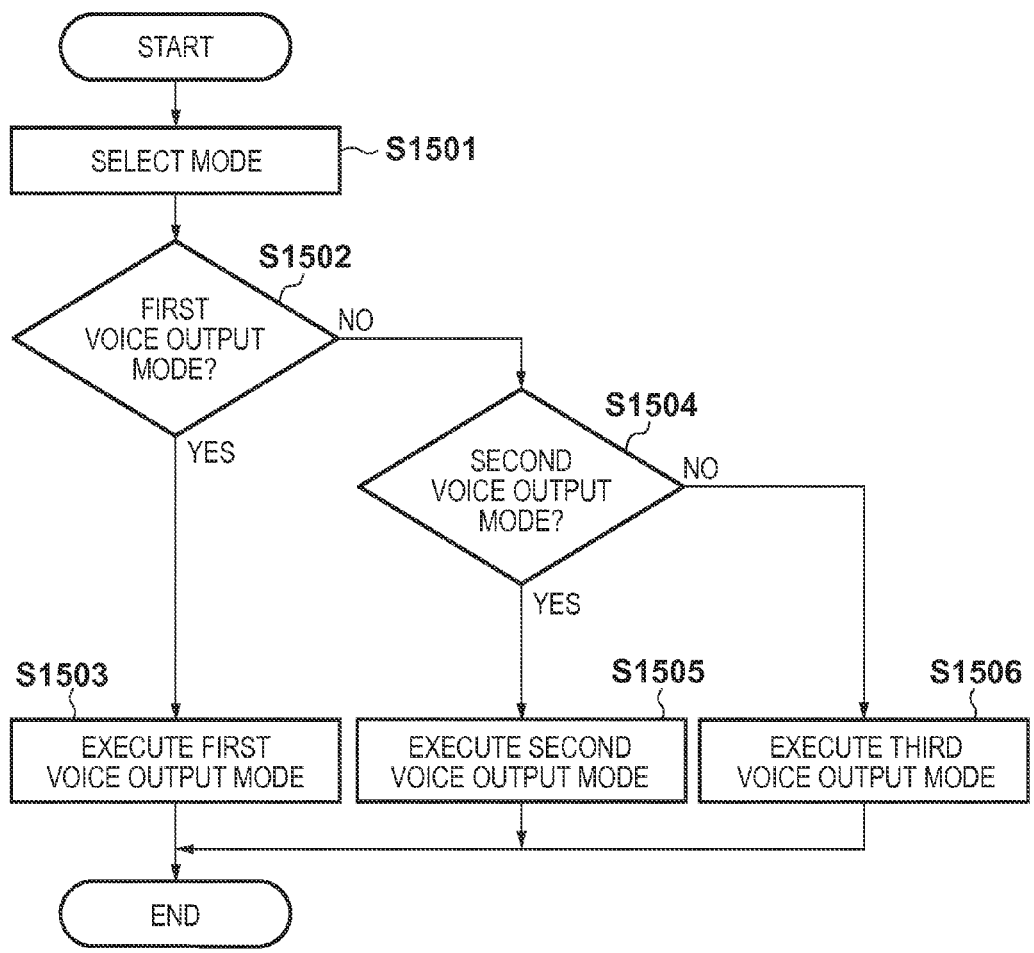
FIG. 15 is a flowchart of the operation of an information processing apparatus 2300.

The operation of the information processing apparatus 2300 according to this embodiment will be described below with reference to the flowchart shown in FIG. 15.

In step S1501, the input unit 201 detects which of the buttons 2301 to 2303 is pressed, and the mode switching unit 2901 sets the mode according to the pressed button detected by the input unit 201.

If the mode set in this step is the first voice output mode, the process advances to step S1503 via step S1502. In step S1503, the respective processes described in the first embodiment are executed.

If the mode set in this step is the second voice output mode, the process advances to step S1505 via steps S1502 and S1504. In step S1505, the respective processes described in the second embodiment are executed.

If the mode set in this step is the third voice output mode, the process advances to step S1506 via steps S1502 and S1504. In step S1506, the respective processes described in the third embodiment are executed.

Note that the aforementioned first to fourth embodiments can be combined as needed when they are used. Note that when these embodiments are combined, components may be omitted or added as needed.

[Fifth Embodiment]

All of the respective units shown in FIGS. 2 and 29 may be implemented by hardware. For example, the voice output position storage unit 208 may be implemented by a memory, and other units may be implemented by software (computer programs). An example of the hardware arrangement of a computer applicable to the information processing apparatuses 101 and 2300 in such case will be described below with reference to the block diagram shown in FIG. 3.

A CPU 301 controls the operations of the overall computer using computer programs and data stored in a RAM 302 and ROM 303, and executes the respective processes which have been described as those to be implemented by the information processing apparatuses 101 and 2300.

The RAM 302 has an area used to temporarily store computer programs and data loaded from an external memory 308 such as an HDD (Hard Disk Drive), and a work area used when the CPU 301 executes various kinds of processing. That is, the RAM 302 can provide various areas as needed. The ROM 303 stores setting data, a boot program, and the like of the computer.

An input unit 304 corresponds to the aforementioned voice output button 104, buttons 2301 to 2303, and touch sensor in the touch panel screen 102, and can input various instructions to the CPU 301, as described above. A display unit 305 corresponds to the aforementioned touch panel screen 102. A voice output unit 306 corresponds to the aforementioned loudspeaker 103.

The external memory 308 saves an OS (Operating System), and computer programs and data required to control the CPU 301 to execute various kinds of processing described in the above embodiments. These computer programs include those which correspond to the respective units except for the voice output position storage unit 208 in FIGS. 2 and 29. Also, these data include electronic book content data and those which have been described as given data in the above processes.

The computer programs and data saved in the external memory 308 are loaded onto the RAM 302 as needed under the control of the CPU 301, and are to be processed by the CPU 301. The aforementioned units are connected to a common bus 307. Note that the aforementioned voice output position storage unit 208 corresponds to the external memory 308 and RAM 302.

Figure 3:
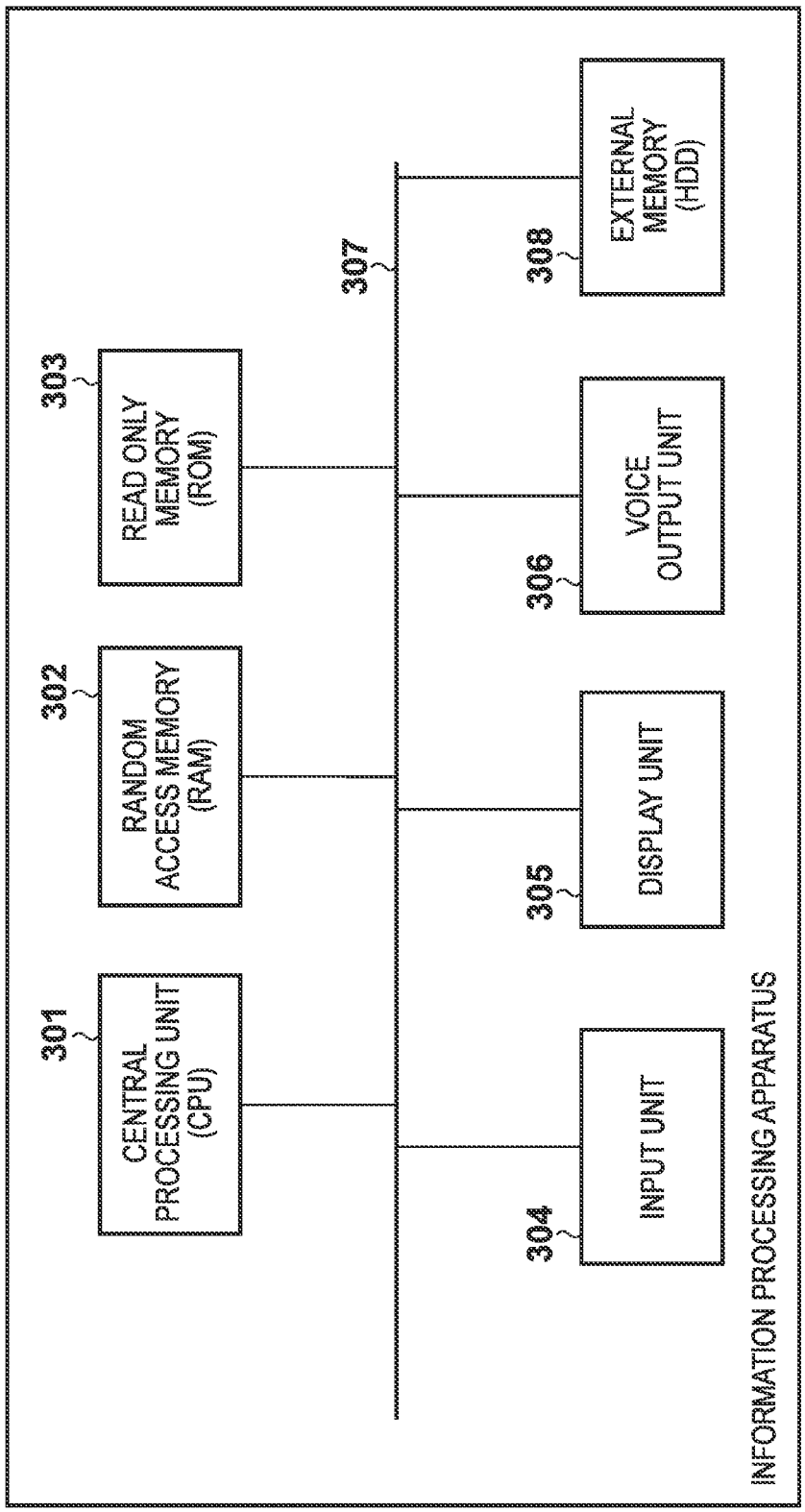
FIG. 3 is a block diagram showing an example of the hardware arrangement of a computer.

Note that each of the information processing apparatuses having the functional arrangements shown in FIGS. 2 and 29 may be implemented by a single computer having the arrangement shown in FIG. 3. Alternatively, this information processing apparatus may be implemented using a plurality of apparatuses.

Note that some of the units shown in FIGS. 2 and 29 may be implemented by hardware/software without implementing all of the units by hardware/software. Even in this case, this software is stored in a memory, and is executed by the CPU 301.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-240661 filed Nov. 1, 2011 which is hereby incorporated by reference herein in its entirety.

What is claimed is:

1. An information processing apparatus comprising:
a display unit configured to display a page designated by a page designation instruction of pages included in an electronic book;
a voice output unit configured to, in a case of inputting a voice output instruction, sequentially output voices corresponding to respective characters in a target page being a page displayed by said display unit at an input timing of the voice output instruction, in accordance with an arrangement order of the characters;
a control unit configured to determine a start character from which said voice output unit starts a voice output operation based on characters in the target page, and to control said voice output unit to sequentially output voices corresponding to characters, which include the start character and subsequent characters in accordance with the arrangement order; and
a timer unit configured to measure a display continuous time of a page designated by an input page designation instruction on said display unit every time the page designation instruction is input,
wherein when a page whose display continuous time is measured by said timer unit and is not less than a predetermined time, is the target page for which said voice output unit has output voices lastly, said control unit sets, as a last character, a character for which said voice output unit output a voice at an input timing of a first page designation instruction after said voice output unit starts to output voices for the target page, and controls said voice output unit to sequentially output voices, in accordance with the arrangement order, corresponding to respective characters which include a character located in the vicinity of a next character of the last character and subsequent characters in the arrangement order.

2. The apparatus according to claim 1, wherein when a page whose display continuous time is not less than the predetermined time, is a subsequent page having a page number larger than that of the target page, said control unit controls said voice output unit to sequentially output voices corresponding to respective characters, which include a start character and subsequent characters in the subsequent page in accordance with an arrangement order of the characters in the subsequent page.

3. The apparatus according to claim 1, wherein when a page whose display continuous time is not less than the predetermined time, is a previous page having a page number smaller than that of the target page, said control unit specifies a noun from a sentence including the last character in the target page, specifies a sentence including the specified noun from the previous page, and controls said voice output unit to sequentially output voices corresponding to respective characters, which include a start character and subsequent characters in the specified sentence in accordance with an arrangement order of the characters in the specified sentence.

4. The apparatus according to claim 1, wherein when a page whose display continuous time is not less than the predetermined time, is a previous page having a page number smaller than that of the target page, said control unit specifies a noun from a sentence including the last character in the target page, specifies a title including the specified noun from the previous page, and controls said voice output unit to sequentially output voices corresponding to respective characters, which include a start character and subsequent characters in the specified title in accordance with an arrangement order of the characters in the specified title.

5. The apparatus according to claim 1, wherein when a page whose display continuous time is not less than the predetermined time, is a previous page having a page number smaller than that of the target page, said control unit controls said voice output unit to sequentially output voices corresponding to respective characters, which include a start character of a sentence of a specific type and subsequent characters in the previous page in accordance with an arrangement order of the characters in the sentence of the specific type in the previous page.

6. The apparatus according to claim 1, wherein said control unit further calculates a duration between timings from an input detection timing of a first page designation instruction after said voice output unit starts to output voices for the target page until a timing at which the display continuous time becomes not less than the predetermined time,
when a page whose display continuous time is not less than the predetermined time, is the target page, and when the duration is less than a first threshold, said control unit controls said voice output unit to sequentially output voices corresponding to respective characters, which include a next character of the last character and subsequent characters in the target page in accordance with an arrangement order of this respective characters, and
when a page whose display continuous time is not less than the predetermined time, is the target page, and when the duration is more than the first threshold, said control unit controls said voice output unit to sequentially output voices corresponding to respective characters, which include a start character and subsequent characters in the target page in accordance with an arrangement order of the characters in the target page or to sequentially output voices corresponding to respective characters, which include a start character and subsequent characters in a sentence of a paragraph including the last character in the target page in accordance with an arrangement order of the characters in the sentence of the paragraph.

7. The apparatus according to claim 6, further comprising a unit configured to set the first threshold using an input count of page designation instructions between the timings.

8. A non-transitory computer-readable storage medium storing a computer program for controlling a computer to function as respective units of an information processing apparatus of claim 1.

9. An information processing method comprising the steps of:
displaying a page designated by a page designation instruction of pages included in an electronic book;
in a case of inputting a voice output instruction, sequentially outputting voices corresponding to respective characters in a target page being a page displayed in the displaying step at an input timing of the voice output instruction, in accordance with an arrangement order of the characters;
determining a start character from which the voice output step starts a voice output operation based on characters in the target page, and controlling the voice output step to sequentially output voices corresponding to characters, which include the start character and subsequent characters in accordance with the arrangement order;
a timer step of measuring a display continuous time of a page designated by an input page designation instruction in the display step every time the page designation instruction is input,
wherein in the control step, when a page whose display continuous time is measured in the timer step and is not less than a predetermined time, is the target page for which the voice output step has output voices lastly, a character, for which a voice was output in the voice output step at an input timing of a first page designation instruction after said voice output step to output voices for the target page, is set as a last character, and voices corresponding to respective characters, which include a character located in the vicinity of a next character of the last character and subsequent characters in the arrangement order, are controlled to be sequentially output in the voice output step in accordance with the arrangement order.

10. The method according to claim 9, wherein in the control step, when a page whose display continuous time is not less than the predetermined time, is a subsequent page having a page number larger than that of the target page, voices corresponding to respective characters, which include a start character and subsequent characters in the subsequent page, are controlled to be sequentially output in the voice output step in accordance with an arrangement order of the characters in the subsequent page.

11. The method according to claim 9, wherein in the control step, when a page whose display continuous time is not less than the predetermined time, is a previous page having a page number smaller than that of the target page, a noun is specified from a sentence including the last character in the target page, a sentence including the specified noun is specified from the previous page, and voices corresponding to respective characters, which include a start character and subsequent characters in the specified sentence, are controlled to be sequentially output in the voice output step in accordance with an arrangement order of the characters in the specified sentence.

12. The method according to claim 9, wherein in the control step, when a page whose display continuous time is not less than the predetermined time, is a previous page having a page number smaller than that of the target page, a noun is specified from a sentence including the last character in the target page, a title including the specified noun is specified from the previous page, and voices corresponding to respective characters, which include a start character and subsequent characters in the specified title, are controlled to be sequentially output in the voice output step in accordance with an arrangement order of the characters in the specified title.

13. The method according to claim 9, wherein in the control step, when a page whose display continuous time is not less than the predetermined time, is a previous page having a page number smaller than that of the target page, voices corresponding to respective characters, which include a start character of a sentence of a specific type and subsequent characters in the previous page, are controlled to be sequentially output in the voice output step in accordance with an arrangement order of the characters in the sentence of the specific type in the previous page.

14. The method according to claim 9, wherein in the control step, a duration between timings from an input detection timing of a first page designation instruction after the voice output step starts to output voices for the target page until a timing at which the display continuous time becomes not less than the predetermined time is further calculated,
when a page whose display continuous time is not less than the predetermined time, is the target page, and when the duration is less than a first threshold, voices corresponding to respective characters, which include a next character of the last character and subsequent characters in the target page, are controlled to be sequentially output in the voice output step in accordance with an arrangement order of this respective characters, and
when a page whose display continuous time is not less than the predetermined time, is the target page, and when the duration is more than the first threshold, voices corresponding to respective characters, which include a start character and subsequent characters in the target page, are controlled to be sequentially output in the voice output step in accordance with an arrangement order of the characters in the target page or voices corresponding to respective characters, which include a start character and subsequent characters in a sentence of a paragraph including the last character, are controlled to be sequentially output in the voice output step in accordance with an arrangement order of the characters in the sentence of the paragraph.

15. The method according to claim 14, further comprising a step of setting the first threshold using an input count of page designation instructions between the timings.

16. An information processing apparatus having a voice output unit for reading out a page, comprising:
a determination unit constructed to, in a case where a page which is designated, as a page to be displayed on a screen among a plurality of pages, after the voice output unit starts to read out a target page included in the plurality of pages is the target page, set, as a last readout position, a readout position in the target page for which said voice output unit read out at an input timing of a first instruction of the designation after the voice output unit starts to read out the target page; and
a control unit constructed to control said voice output unit to restart to read out the target page from the vicinity of the last readout position.

17. An information processing method using a voice output unit for reading out a page, the method comprising:
a determination step of determining, in a case where a page which is designated, as a page to be displayed on a screen among a plurality of pages, after the voice output unit starts to read out a target page included in the plurality of pages is the target page, set, as a last readout position, a readout position in the target page for which said voice output unit read out at an input timing of a first instruction of the designation after the voice output unit starts to read out the target page; and
a control step of controlling said voice output unit to restart to read out the target page from the vicinity of the last readout position.

18. A non-transitory computer readable storage medium storing a program which causes a computer to execute a method using a voice output unit for reading out a page, the method comprising:
a determination step of determining, in a case where a page which is designated, as a page to be displayed on a screen among a plurality of pages, after the voice output unit starts to read out a target page included in the plurality of pages is the target page, set, as a last readout position, a readout position in the target page for which said voice output unit read out at an input timing of a first instruction of the designation after the voice output unit starts to read out the target page; and
a control step of controlling said voice output unit to restart to read out the target page from the vicinity of the last readout position.

* * * * *